United States Patent
Zhang et al.

(10) Patent No.: US 11,691,119 B2
(45) Date of Patent: Jul. 4, 2023

(54) LOW TEMPERATURE PLASMA REACTION DEVICE AND HYDROGEN SULFIDE DECOMPOSITION METHOD

(71) Applicants: CHINA PETROLEUM & CHEMICAL CORPORATION, Beijing (CN); CHINA PETROLEUM & CHEMICAL CORPORATION QINGDAO RESEARCH INSTITUTE OF SAFETY ENGINEERING, Qingdao (CN)

(72) Inventors: Jing Zhang, Qingdao (CN); Shanjun Mu, Qingdao (CN); Wei Xu, Qingdao (CN); Ning Shi, Qingdao (CN); Shucai Zhang, Qingdao (CN); Guosheng Dong, Qingdao (CN); Tie Zhang, Qingdao (CN); Lin Wang, Qingdao (CN); Junpeng Ren, Qingdao (CN); Feng Sun, Qingdao (CN)

(73) Assignees: CHINA PETROLEUM & CHEMICAL CORPORATION, Beijing (CN); CHINA PETROLEUM & CHEMICAL CORPORATION QINGDAO RESEARCH INSTITUTE OF SAFETY ENGINEERING, Qingdao (CN)

( * ) Notice: Subject to any disclaimer, the term of this patent is extended or adjusted under 35 U.S.C. 154(b) by 352 days.

(21) Appl. No.: 16/968,785

(22) PCT Filed: Jan. 31, 2019

(86) PCT No.: PCT/CN2019/074087
§ 371 (c)(1),
(2) Date: Aug. 10, 2020

(87) PCT Pub. No.: WO2019/154245
PCT Pub. Date: Aug. 15, 2019

(65) Prior Publication Data
US 2020/0398245 A1    Dec. 24, 2020

(30) Foreign Application Priority Data

Feb. 9, 2018  (CN) .......................... 201810135990.8
Feb. 9, 2018  (CN) .......................... 201810136781.5
(Continued)

(51) Int. Cl.
*B01J 19/08*        (2006.01)
*B01J 19/24*        (2006.01)
(Continued)

(52) U.S. Cl.
CPC ......... *B01J 19/088* (2013.01); *B01J 19/2445* (2013.01); *C01B 3/04* (2013.01);
(Continued)

(58) Field of Classification Search
CPC .................. B01J 19/088; B01J 19/2445; B01J 2219/0809; B01J 2219/00038;
(Continued)

(56) References Cited

U.S. PATENT DOCUMENTS

| | | |
|---|---|---|
| 3,933,608 A | 1/1976 | Haas et al. |
| 5,211,923 A | 5/1993 | Harkness et al. |

(Continued)

FOREIGN PATENT DOCUMENTS

| | | | | |
|---|---|---|---|---|
| CN | 1956143 A | * | 5/2007 | ........ H01J 37/32091 |
| CN | 201033280 Y | * | 3/2008 | |

(Continued)

OTHER PUBLICATIONS

Vandenbroucke et al., "Non-thermal plasmas for non-catalytic and catalytic VOC abatement," Journal of Hazardous Materials, 2011, vol. 195, pp. 30-54.
(Continued)

*Primary Examiner* — Xiuyu Tai

(74) *Attorney, Agent, or Firm* — Buchanan, Ingersoll & Rooney PC

(57) ABSTRACT

Described are a low temperature plasma reaction device and a hydrogen sulfide decomposition method. The reaction device includes: a first cavity; a second cavity, the second cavity being embedded inside or outside the first cavity; an inner electrode, the inner electrode being arranged in the first cavity; an outer electrode; and a barrier dielectric arranged between the outer electrode and the inner electrode. The hydrogen sulfide decomposition method includes: implementing dielectric barrier discharge at the outer electrode and the inner electrode of the low temperature plasma reaction device, introducing a raw material gas containing hydrogen sulfide into the first cavity to implement a hydrogen sulfide decomposition method, and continuously introducing a thermally conductive medium into the second cavity in order to control the temperature of the first cavity of the low temperature plasma reaction device.

22 Claims, 6 Drawing Sheets

(30) Foreign Application Priority Data

| Feb. 9, 2018 | (CN) | .......................... 201810136786.8 |
| Feb. 9, 2018 | (CN) | .......................... 201810136792.3 |
| Feb. 9, 2018 | (CN) | .......................... 201810136801.9 |
| Feb. 9, 2018 | (CN) | .......................... 201810136805.7 |

(51) Int. Cl.
  *C01B 3/04* (2006.01)
  *C01B 17/04* (2006.01)
  *H05H 1/24* (2006.01)

(52) U.S. Cl.
  CPC ....... *C01B 17/0495* (2013.01); *H05H 1/2406* (2013.01); *B01J 2219/00038* (2013.01); *B01J 2219/0813* (2013.01); *B01J 2219/0869* (2013.01); *B01J 2219/0875* (2013.01); *B01J 2219/0896* (2013.01); *H05H 1/245* (2021.05); *H05H 1/246* (2021.05)

(58) Field of Classification Search
  CPC ........ B01J 2219/0813; B01J 2219/0869; B01J 2219/0875; B01J 2219/0896; B01J 2219/0841; B01J 2219/0894; C01B 3/04; C01B 17/0495; C01B 2203/0861; H05H 1/2406; H05H 1/2439; H05H 1/2441; H05H 1/246; H05H 1/245; H01J 2237/338; H01J 37/32055; H01J 37/3244; H01J 37/3255; Y02E 60/36
  See application file for complete search history.

(56) References Cited

U.S. PATENT DOCUMENTS

| 2010/0300872 A1 | 12/2010 | Gutsol et al. |
| 2012/0141181 A1 | 6/2012 | Bisaiji et al. |

FOREIGN PATENT DOCUMENTS

| CN | 101274213 A | | 10/2008 | |
| CN | 201169552 Y | | 12/2008 | |
| CN | 101510493 A | | 8/2009 | |
| CN | 101590410 A | | 12/2009 | |
| CN | 102408095 A | | 4/2012 | |
| CN | 101884517 B | * | 7/2012 | |
| CN | 103204466 A | | 7/2013 | |
| CN | 103204467 A | | 7/2013 | |
| CN | 103435014 A | | 12/2013 | |
| CN | 103495427 A | | 1/2014 | |
| CN | 203440161 U | * | 2/2014 | |
| CN | 203874761 U | * | 10/2014 | |
| CN | 104411082 A | * | 3/2015 | |
| CN | 104941401 A | | 9/2015 | |
| CN | 206149580 U | * | 5/2017 | |
| CN | 208553673 U | | 3/2019 | |
| CN | 208553684 U | | 3/2019 | |
| CN | 208561680 U | | 3/2019 | |
| CN | 208561681 U | | 3/2019 | |
| CN | 208577431 U | | 3/2019 | |
| EP | 1 038 855 A1 | | 3/2000 | |
| EP | 1453082 A1 | * | 9/2004 | ............ C07C 17/25 |
| JP | 2009170267 A | * | 7/2009 | .......... H05H 1/2406 |
| KR | 20110026552 A | * | 3/2011 | |
| KR | 20110038418 A | * | 4/2011 | |
| KR | 20120139951 A | * | 12/2012 | |
| KR | 1545201 B1 | * | 8/2015 | ................ B01J 8/00 |
| KR | 1557880 B1 | * | 10/2015 | .......... C23C 16/505 |
| RU | 2016183 C1 | | 7/1994 | |
| RU | 2131396 C1 | | 6/1999 | |
| RU | 2575722 C2 | | 11/2015 | |
| TW | 201736463 A | * | 10/2017 | ....... B32B 17/10403 |
| WO | 2014/138013 A1 | | 9/2014 | |
| WO | WO-2016186431 A1 | * | 11/2016 | ............... H05H 1/24 |
| WO | WO-2017217833 A1 | * | 12/2017 | .......... B01D 53/047 |

OTHER PUBLICATIONS

Zhao et al., "Energy efficiency optimization for H2S removal by dielectric barrier discharge plasma," Modern Chemical Industry, Oct. 2017, vol. 37, No. 10, pp. 152-157, with English abstract.
International Search Report (PCT/ISA/210) dated Apr. 17, 2019, by the State Intellectual Property Office of the P.R. China as the International Searching Authority for International Application No. PCT/CN2019/074087, and an English translation of the International Search Report.
Written Opinion (PCT/ISA/237) dated Apr. 17, 2019, by the State Intellectual Property Office of the P.R. China as the International Searching Authority for International Application No. PCT/CN2019/074087.

* cited by examiner

LOW TEMPERATURE PLASMA REACTION DEVICE AND HYDROGEN SULFIDE DECOMPOSITION METHOD

FIELD OF THE INVENTION

The invention relates to the technical field of plasma chemistry, in particular to a low-temperature plasma reaction apparatus and a method for decomposing hydrogen sulfide.

BACKGROUND OF THE INVENTION

Hydrogen sulfide ($H_2S$) is a highly toxic and malodorous acid gas, which not only can cause corrosion of materials such as metal, but also harm human health and pollute the environment. At present, the large and medium oil refineries in China have adopted the traditional Claus method to treat tail gas containing $H_2S$ and recover sulphur. The process merely recovers sulphur from the hydrogen sulfide, but converts valuable hydrogen into water. From the viewpoint of comprehensively utilizing resources, the hydrogen resource is not effectively utilized in the conventional hydrogen sulfide recovery process.

Therefore, the decomposition of hydrogen sulfide into sulphur and hydrogen gradually becomes a key technical field attracting attention from scientific researchers at home and abroad.

The current hydrogen sulfide decomposition process mainly comprises the following methods: a high-temperature pyrolysis method, an electrochemical method, a photocatalysis method, a low-temperature plasma method and the like. Among the aforementioned methods, the high-temperature pyrolysis method is relatively mature in terms of industrial technology, but the thermal decomposition of hydrogen sulfide strongly depends on the reaction temperature and is limited by the thermodynamic equilibrium, and even if the reaction temperature is over 1,000° C., the conversion of hydrogen sulfide is merely 20%. In addition, the high temperature condition imposes high requirements on the reactor materials, which also increases the operating costs. Moreover, due to the low conversion of hydrogen sulfide in the pyrolysis process, a large amount of hydrogen sulfide gas needs to be separated from the tail gas and circulated in the system, thereby reducing efficiency of the device and increasing the energy consumption, each the factors brings difficulties to the large-scale industrial application of the device. Although the membrane technology can be used for effectively separating products, thereby breaking the equilibrium limit and improving the conversion of hydrogen sulfide, the thermal decomposition temperature often exceeds the heat-resistant limiting temperature of the membrane, such that a structure of the membrane material is damaged. The electrochemical method has the disadvantages such as many operation steps, serious equipment corrosion, poor reaction stability and low efficiency. The photo-catalytic method for decomposing hydrogen sulfide mainly refers to the research of photo-catalytic decomposition of water, and the research focuses on the aspects of developing high-efficiency semiconductor photo-catalysts and the like. The method for decomposing hydrogen sulfide by using the solar energy has the advantages such as low energy consumption, mild reaction conditions and simple operational process, it is a relatively economic method. However, the method has problems such as a small amount of treatment, low catalytic efficiency, and easy deactivation of the catalyst.

Compared with other decomposition methods, the low-temperature plasma method has the advantages of simple operation, small device volume and high energy efficiency, and the reaction involved in the method has high controllability and can be flexibly applied under the conditions that the treatment capacity is small and it is difficult to perform centralized treatment. Moreover, thanks to that the low-temperature plasma method has the characteristics of high energy density and shortened reaction time, the hydrogen sulfide can be effectively decomposed at a relatively lower temperature, thus the method is suitable for occasions with different scales, dispersed layout and variable production conditions. In addition, the hydrogen resource is recovered by the low-temperature plasma method while the sulphur is recovered, so that the resource utilization of the hydrogen sulfide can be realized.

At present, researchers at home and abroad have implemented comprehensive researches on the technology of decomposing hydrogen sulfide by low-temperature plasma, and the used discharge modes mainly comprise glow discharge, corona discharge, sliding arc discharge, microwave plasma, radio-frequency plasma, dielectric barrier discharge, etc.

CN102408095A uses dielectric barrier discharge and a photo-catalyst to synergistically decompose hydrogen sulfide, its method relates to packing a solid catalyst having photo-catalytic activity in a plasma region. However, the method has the disadvantage that the sulphur produced by the decomposition of hydrogen sulfide will deposit below the catalyst bed.

CN103204466A discloses a device and method for temperature controlled decomposition of hydrogen sulfide, wherein the device is characterized in that a central electrode is formed by a metal, a grounding electrode is formed by a temperature controllable circulating liquid, and the hydrogen sulfide decomposition process can be continuously and stably carried out through temperature control of the liquid grounding electrode. In addition, CN103204467A discloses a device and a method for preparing hydrogen through continuous and stable decomposition of hydrogen sulfide, and the prior art is characterized in that a central electrode is formed by a metal, a grounding electrode is formed by a temperature controllable circulating liquid, the temperature control is performed by the liquid grounding electrode, the direction of introducing feed gas is the circumferential direction for gas inlet, the feed gas passes through a discharge region in a spiral mode along an axial direction in a reverse direction, so that the generated sulphur is timely and centrifugally separated. However, in order to ensure that the hydrogen sulfide is decomposed as sufficiently as possible in the methods disclosed in CN103204466A and CN103204467A, it is necessary to control the flow rate of the hydrogen sulfide so that the residence time thereof in the inner cylinder of the reactor is longer and the size of the inner cylinder is controlled such that more electric energy is obtained per unit volume of gas in the inner cylinder; in addition, given that the current prior art cannot provide a more powerful power source, the methods disclosed in CN103204466A and CN103204467A can only enable the maximum conversion of the hydrogen sulfide to reach about 20% even if the residence time of the hydrogen sulfide is controlled to be longer and the size of the inner cylinder is controlled such that more electric energy is obtained per unit volume of gas in the inner cylinder, moreover, the energy consumption of the hydrogen sulfide decomposition reaction is rather high when the maximum conversion of the hydrogen sulfide reaches about 20%, thus the methods are unsuitable for large-scale industrial applications. Furthermore, the methods disclosed in CN103204466A and CN103204467A have the disadvantage that the types of available liquid-grounding electrodes are very few, and the disclosed salt solutions and the like can only maintain the temperature of the reactor at less than 100° C. At the temperatures below 100° C., the elemental sulphur is generally in the solid state and is prone to block the reactor.

SUMMARY OF THE INVENTION

The invention aims to overcome the defects of low conversion of hydrogen sulfide and high decomposition energy consumption when the low-temperature plasma reaction apparatus provided by the prior art is used for decomposing the hydrogen sulfide, and provides a novel low-temperature plasma reaction apparatus capable of improving the conversion of the hydrogen sulfide and reducing the decomposition energy consumption and a method for decomposing the hydrogen sulfide by applying the reaction apparatus.

The differences between the "sidewall", the "outer sidewall" and the "inner sidewall" are as follows: "outer sidewall" and "inner sidewall" refer to an outer surface and an inner surface of the "sidewall", respectively, the term "sidewall" refers to the "outer sidewall" and/or the "inner sidewall".

In order to fulfill the above purposes, a first aspect of the present invention provides a low-temperature plasma reaction apparatus comprising:

a first cavity provided with a first inlet and a first outlet, respectively;

a second cavity nested outside or inside the first cavity, and a second inlet and a second outlet are respectively arranged on the second cavity;

an inner electrode, at least part of the inner electrode extends into the first cavity;

an outer electrode forming at least part of the sidewall of the first cavity or being disposed on the sidewall of the first cavity in a surrounding manner; and a barrier dielectric disposed between the inner electrode and the outer electrode such that a discharge region between the inner electrode and the outer electrode is spaced by the barrier dielectric;

both the inner electrode and the outer electrode are solid electrodes, and the shapes of the inner electrode and the outer electrode are matched with each other to form an isodiametric structure;

the distance between the outer sidewall of the inner electrode and the inner sidewall of the outer electrode is denoted as $L_1$, the thickness of the barrier dielectric is denoted as $D_1$, $L_2=L_1-D_1$, and the proportional relation between $L_2$ and $D_1$ is (0.1~100):1.

The term "isodiametric structure" means when the outer sidewall of the inner electrode is smooth, the structure has the minimum distance between any point of the outer sidewall of the inner electrode and the inner sidewall of the outer electrode being equal to the minimum distance between other points of the outer sidewall of the inner electrode and the inner sidewall of the outer electrode; and when the outer sidewall of the inner electrode is not smooth, the structure has the minimum distance between a tip of any convex portion on the outer sidewall of the inner electrode to the inner sidewall of the outer electrode being equal to the minimum distance between tips of other convex portions on the outer sidewall of the inner electrode to the inner sidewall of the outer electrode; similarly, when the inner sidewall of the outer electrode is not smooth, the structure has the minimum distance between a tip of any convex portion on the inner sidewall of the outer electrode to the outer sidewall of the inner electrode being equal to a minimum distance between tips of other convex portions on the inner sidewall of the outer electrode to the outer sidewall of the inner electrode.

Preferably, the proportional relationship between $L_2$ and $D_1$ is (0.1~30):1; more preferably (0.2~15):1.

Preferably, the second cavity is nested outside the first cavity, and the reaction apparatus further comprises: a third cavity nested inside the first cavity, wherein the inner electrode forms at least part of the sidewall of the third cavity or is disposed on the sidewall of the third cavity in a surrounding manner; more preferably, the inner electrode forms at least part of the sidewall of the third cavity or is disposed on the outer sidewall of the third cavity in a surrounding manner.

Preferably, the second cavity is nested inside the first cavity, and the inner electrode forms at least part of the sidewall of the second cavity or is disposed on the sidewall of the second cavity in a surrounding manner; more preferably, the inner electrode forms at least part of the sidewall of the second cavity or is disposed on the outer sidewall of the second cavity in a surrounding manner.

Preferably, the second cavity is nested inside the first cavity, and the reaction apparatus further comprises: a third cavity nested outside of the first cavity.

Preferably, the third cavity is provided with a third inlet and a third outlet, respectively.

In the present invention, the shapes of the first cavity, the second cavity, the third cavity, the inner electrode, the outer electrode, and the barrier dielectric may be, for example, cylindrical, serpentine, fin-shaped, S-shaped, wave-shaped, screw-shaped, or mace-shaped (i.e., having a convex structure on the sidewall).

According to a preferred embodiment, the barrier dielectric forms at least part of the sidewall of the first cavity, or the barrier dielectric is disposed on the inner sidewall of the first cavity in a surrounding manner; more preferably, the first cavity is formed by a barrier dielectric.

According to another preferred embodiment, the outer electrode is arranged on the outer sidewall of the first cavity in a surrounding manner, and the barrier dielectric forms at least part of the sidewall of the first cavity.

According to another preferred embodiment, the barrier dielectric is arranged on at least part of the outer surface of the inner electrode such that at least part of the outer surface of the inner electrode is wrapped with the barrier dielectric. The barrier dielectric may be fixed on the outer surface of the inner electrode in any fixable manner, or the barrier dielectric may be coated on the outer surface of the inner electrode in the form of a coating.

According to another preferred embodiment, the barrier dielectric is disposed between the inner electrode and the outer electrode in a surrounding manner, both the distance between the barrier dielectric and the inner electrode and the distance between the barrier dielectric and the outer electrode are greater than 0. In the preferred embodiment, the barrier dielectric is preferably fixedly connected to the top and/or bottom of the first cavity; more preferably, an end of the barrier dielectric fixedly connected with the first cavity is provided with a pore structure. The pore structure enables the flow of material in the first cavity to be accessed via the pore structure. The present invention does not impose a particular limit on the manner of fixing the barrier dielectric, as long as the barrier dielectric can be disposed between the inner electrode and the outer electrode in a surrounding manner.

In the present invention, the inner electrode may be, for example, a cylindrical shape, the first cavity is a hollow cylinder extending along an axial direction with a constant diameter, and the inner electrode and the first cavity are coaxial.

The low-temperature plasma reaction apparatus provided by the invention is preferably a jacket type dielectric barrier discharge reaction apparatus with a coaxial structure, the basic structure of the low-temperature plasma reaction apparatus mainly comprises an inner electrode, an outer electrode, a barrier dielectric and the like, and the sleeve type structure enables a heat-conducting medium to circularly heat or cool the discharge reaction apparatus, so as to perform the flexible temperature control of a discharge region. In particular, the present invention can significantly improve the conversion of hydrogen sulfide and reduce the energy consumption of decomposing hydrogen sulfide compared to the prior art by controlling the proportional relationship of $L_2$ and the thickness $D_1$ of the barrier dielectric within a specific range and applying the solid inner electrode and the solid outer electrode.

The jacket structure design of the invention can ensure that the heat-conducting medium circularly flows in the shell layer, ensure the discharge intensity and simultaneously maintain the whole reaction apparatus within a certain temperature range, ensure that the generated sulphur flows out of the reaction apparatus in a liquid state, effectively avoid the solidification of the sulphur generated by decomposing hydrogen sulfide, and continuously and stably perform long-period operation of the decomposition process while obtaining a higher conversion rate.

Preferably, the number of the first cavity's is 1.

According to a particularly preferred embodiment, the first cavity is composed of at least two reaction tubes arranged in parallel and having top and bottoms respectively communicating with each other; and each reaction tube is provided with an inner electrode, an outer electrode and the barrier dielectric, respectively. In this particularly preferred embodiment, with respect to each of said reaction tubes, it is preferred that the ratio between $L_2$ and $D_1$ is $L_2:D_1=(0.1~100):1$; preferably $L_2:D_1=(0.1~30):1$; more preferably $(0.2~15):1$. In this particularly preferred embodiment, it is preferred that the inner electrodes in each of the reaction tubes are connected in parallel with each other. In this particularly preferred embodiment, the outer electrodes in each of the reaction tubes are preferably connected in parallel with each other.

According to another particularly preferred embodiment, the number of the first cavities is more than 2, and each of the first cavities is provided with an inner electrode, an outer electrode and the barrier dielectric, respectively. In this particularly preferred embodiment, it is preferred that each of the inner electrodes is connected in parallel with each other. In this particularly preferred embodiment, each of the outer electrodes is preferably connected in parallel with one another.

Preferably, the material of the barrier dielectric is an electrical insulating material, more preferably, at least one selected from the group consisting of glass, quartz, ceramic, enamel, polytetrafluoroethylene and mica. The glass can be quartz glass or hard glass; the material forming the barrier dielectric may further be other metallic and non-metallic composite materials with high-voltage electrical insulation design. The ceramic may be an alumina ceramic.

Preferably, the outer electrode and the inner electrode are conductive materials. Preferably, each of the outer electrode and the inner electrode may be independently selected from at least one of the group consisting of a graphite tube, a graphite powder, a metal rod, a metal foil, a metal mesh, a metal tube, a metal powder, and a graphite rod.

The metal rod and the metal tube may comprise a simple substance metal rod, an alloy metal rod, a simple substance metal tube and an alloy metal tube. The metal powder may comprise a simple substance metal powder, an alloyed metal powder or a mechanical mixture of the simple substance metal powder and/or alloyed metal powder. The material forming the electrodes (including the inner electrode and the outer electrode) of the present invention may be other rod-shaped and tubular materials having conductive properties.

In the present invention, it is preferable that one of the inner electrode and the outer electrode is a grounding electrode, and the other is a high-voltage electrode. The materials of the inner electrode and the outer electrode can be determined by those skilled in the art according to the application requirements.

Preferably, the reaction apparatus of the present invention further comprises a ground lead, one end of which is electrically connected with the outer electrode or the inner electrode.

Preferably, the first inlet is disposed at an upper portion of the first cavity, and the first outlet is disposed at a lower portion and/or a bottom of the first cavity.

Preferably, the first outlet comprises a gas product outlet and a liquid product outlet, and the gas product outlet is disposed at a lower portion of the first cavity, and the liquid product outlet is disposed at a bottom of the first cavity.

Preferably, the gas product outlet is disposed below the discharge region, and a proportional relationship between a height $H_1$ of the gas product outlet with respect to the bottom of the first cavity and a length $L_3$ of the discharge region is: $H_1:L_3=1:(0.05~25000)$; preferably $H_1:L_3=1:(0.1~10000)$; more preferably $H_1:L_3=1:(0.5~1000)$.

In the present invention, the "discharge region" means an area where the inner electrode, the outer electrode, and the barrier dielectric are completely overlapped.

The ratio of the inner diameter of the first cavity to the aperture of the first outlet may be $(0.1~100):1$.

The ratio of the aperture of the first inlet to the aperture of the first outlet in the present invention may be $(0.1~120):1$.

The ratio of the length of the first cavity to the inner diameter of the first cavity may be $(0.5~500):1$. The inner diameter of the first cavity represents the distance from the axial core of the first cavity to the outer sidewall of the first cavity.

Preferably, the second inlet and the second outlet are disposed at a lower portion and an upper portion of the second cavity, respectively.

The first inlet of the present invention may be arranged such that the feed gas entering the first cavity is parallel to or at an angle in regard to the inner diameter of the first cavity, e.g. may be arranged tangentially in regard to the inner diameter of the first cavity.

Preferably, the third inlet and the third outlet are respectively provided at a lower portion and an upper portion of the third cavity.

The temperature of the reaction apparatus with the jacket structure can be maintained between 119~444.6° C. for example by introducing a heat conducting medium into the second cavity or the third cavity. In this case, the generated sulphur can continuously flow out in a liquid form.

The low-temperature plasma reaction apparatus of the present invention may be further loaded with a catalyst being capable of catalyzing the decomposition of hydrogen sulfide into elemental sulphur and hydrogen gas, and the catalyst is preferably loaded in the first cavity of the reaction apparatus. The present invention has no particular requirement on the loading volume and type of the catalyst, and the type of the catalyst may be, for example, any one or more of the catalysts disclosed in CN102408095A, CN101590410A and CN103495427A.

The low-temperature plasma reaction apparatus provided by the invention can be used for plasma decomposition of hydrogen sulfide, and can generate uniform and efficient dielectric barrier discharge, so that hydrogen sulfide is directly decomposed into hydrogen and sulphur.

A second aspect of the present invention provides a method for decomposing hydrogen sulfide, which is carried out in the low-temperature plasma reaction apparatus according to the first aspect of the present invention, the method comprising: connecting one of an outer electrode and an inner electrode of the low-temperature plasma reaction apparatus with a high-voltage power supply, the other of an outer electrode and an inner electrode is grounded to carry out the dielectric barrier discharge; introducing feed gas containing hydrogen sulfide into a first cavity of the low-temperature plasma reaction apparatus from a first inlet of the first cavity of the low-temperature plasma reaction apparatus to carry out decomposition reaction of the hydrogen sulfide, discharging a material flow obtained after the decomposition via a first outlet, and continuously introducing a heat-conducting medium into a second cavity of the low-temperature plasma reaction apparatus from a second inlet and discharging the heat-conducting medium via a second outlet so as to control the temperature of the first cavity of the low-temperature plasma reaction apparatus.

The method of the present invention preferably further comprises: continuously introducing a heat-conducting medium into the third cavity of the low-temperature plasma reaction apparatus from the third inlet and discharging the heat-conducting medium via the third outlet, which is in synergy with continuously introducing a heat-conducting medium into the second cavity of the low-temperature plasma reaction apparatus from the second inlet and discharging the heat-conducting medium via the second outlet so as to control the temperature of the first cavity of the low-temperature plasma reaction apparatus.

Preferably, the conditions of the dielectric barrier discharge include: the discharge voltage is 2 kV~80 kV, preferably 5 kV~30 kV, more preferably 5 kV~20 kV, and further more preferably 5 kV~15 kV; the discharge frequency is 200~30,000 Hz, preferably 500~15,000 Hz, and more preferably 500~13,000 Hz.

Preferably, the conditions of the decomposition reaction include: the reaction temperature is 0~800° C., preferably 40~500° C., and more preferably 119~444.6° C.; the reaction pressure is 0-0.6 MPa, preferably 0-0.3 MPa.

Preferably, the residence time of the feed gas containing hydrogen sulfide in the discharge region of the low-temperature plasma reaction apparatus is $1\times10^{-5}$~120 s, preferably $2\times10^{-5}$~60 s.

Preferably, the decomposition reaction of hydrogen sulfide is carried out in the presence of a carrier gas, the carrier gas is at least one selected from the group consisting of nitrogen, hydrogen, helium, argon, water vapor, carbon monoxide, carbon dioxide, methane, ethane, and propane.

Particularly preferably, the carrier gas is at least one selected from the group consisting of hydrogen, argon, helium and nitrogen.

Preferably, the content of the hydrogen sulfide gas in the feed gas is $1\times10^{-8}$~100% by volume, more preferably 10~100% by volume of the hydrogen sulfide gas at the first inlet of the low-temperature plasma reaction apparatus.

In the present invention, the feed gas does not include the aforementioned carrier gas of the present invention, the feed gas is pure hydrogen sulfide gas or industrial exhaust gas containing hydrogen sulfide and other gases obtained in industrial production, although the feed gas may contain the same kind of gas as the carrier gas defined in the present invention, the carrier gas defined in the present invention is the gas that is voluntarily added to be mixed with the feed gas, and the method of the present invention can control the amount of the added carrier gas as needed.

The disclosure provides a preferred embodiment of decomposing hydrogen sulfide by applying the aforementioned low-temperature plasma reaction apparatus of the present invention as follows:

introducing a protective gas such as nitrogen into the first cavity of the low-temperature plasma reaction apparatus from the first inlet to purge air in the discharge region, and discharging the gas via the first outlet; in the meanwhile, introducing the heat-conducting medium into the second cavity from the second inlet, and discharging the introduced heat-conducting medium via the second outlet; maintaining the temperature of the heat-conducting medium at a temperature required for the system reaction; subsequently introducing feed gas containing hydrogen sulfide into the first cavity of the low-temperature plasma reaction apparatus from the first inlet, switching on the high-voltage power supply after the feed gas flow is stable, and forming a plasma discharge field between the inner electrode and the outer electrode by adjusting the voltage and frequency of the high-voltage power supply; performing ionization of hydrogen sulfide gas in the discharge region and decomposing the hydrogen sulfide gas into hydrogen and elemental sulphur, and the elemental sulphur generated by discharge flowing down slowly along the first cavity wall and flowing out from the first outlet.

The disclosure provides another preferred embodiment of decomposing hydrogen sulfide using the aforementioned low-temperature plasma reaction apparatus of the present invention as follows:

introducing a protective gas such as nitrogen into the first cavity of the low-temperature plasma reaction apparatus from the first inlet to purge air in the discharge region, and discharging the gas via the first outlet; in the meanwhile, introducing the heat-conducting medium into the second cavity from the second inlet, and discharging the introduced heat-conducting medium via the second outlet; and introducing the heat-conducting medium into the third cavity from the third inlet, and discharging the introduced heat-conducting medium via the third outlet; maintaining the temperature of the heat-conducting medium at a temperature required for the system reaction; subsequently introducing feed gas containing hydrogen sulfide into the first cavity of the low-temperature plasma reaction apparatus from the first inlet, switching on the high-voltage power supply after the feed gas flow is stable, and forming a plasma discharge field between the inner electrode and the outer electrode by adjusting the voltage and frequency of the high-voltage power supply; performing ionization of hydrogen sulfide gas in the discharge region and decomposing the hydrogen sulfide gas into hydrogen and elemental sulphur, and the elemental sulphur generated by discharge flowing down slowly along the first cavity wall and flowing out from the first outlet.

The low-temperature plasma reaction apparatus provided by the invention can facilitate the continuous and stable operation of the hydrogen sulfide decomposition process with an obviously higher hydrogen sulfide conversion rate, and the apparatus is suitable for the long-period operation.

In addition, the low-temperature plasma reaction apparatus provided by the invention can also be used for a treatment process of hydrogen sulfide with mass flow and high concentration.

DESCRIPTION OF REFERENCE SIGNS

Figure 1A:
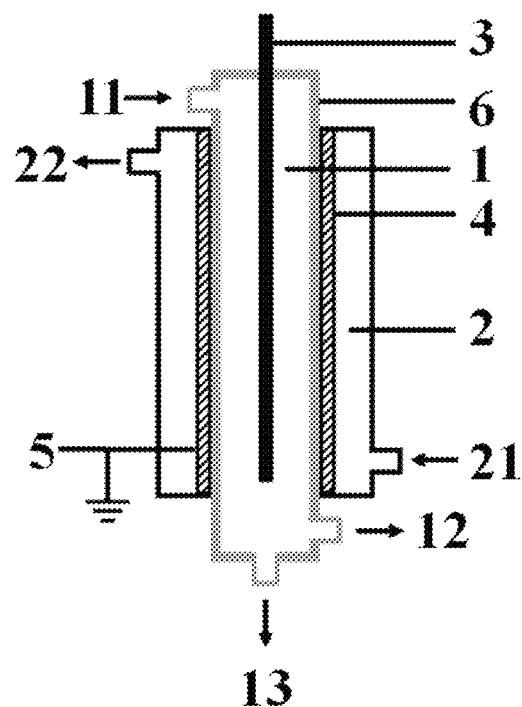
FIG. 1a is a structurally schematic view of a preferred specific embodiment of the low-temperature plasma reaction apparatus provided by the invention, in which a second cavity is disposed outside a first cavity.

1. First cavity
2. Second cavity
3. Inner electrode
4. Outer electrode
5. Ground lead
6. Barrier dielectric
7. Third cavity
11. First inlet
12. Gas product outlet
13. Liquid product outlet
21. Second inlet
22. Second outlet
71. Third inlet
72. Third outlet

DETAILED DESCRIPTION OF THE PREFERRED EMBODIMENTS

The endpoints and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

The following content in conjunction with FIG. 1a provides the structure of a preferred embodiment of the low-temperature plasma reaction apparatus of the present invention, specifically:

the reaction apparatus has a coaxial jacket cylinder structure, and the reaction apparatus comprises:

a first cavity 1 provided with a first inlet 11 and a first outlet, respectively;

a second cavity 2 nested outside the first cavity 1, and a second inlet 21 and a second outlet 22 are respectively arranged on the second cavity 2;

an inner electrode 3 disposed in the first cavity 1;

an outer electrode 4 forming at least part of the sidewall of the first cavity 1 or is disposed on the outer sidewall of the first cavity 1 in a surrounding manner; and a barrier dielectric forming at least part of the sidewall of the first cavity 1 or is disposed on the inner sidewall of the first cavity 1 in a surrounding manner, and the barrier dielectric is disposed between the inner electrode 3 and the outer electrode 4 such that a discharge region between the inner electrode 3 and the outer electrode 4 is spaced by the barrier dielectric;

both the inner electrode 3 and the outer electrode 4 are solid electrodes, and the shapes of the inner electrode 3 and the outer electrode 4 are matched with each other to form an isodiametric structure;

the distance between the outer sidewall of the inner electrode 3 and the inner sidewall of the outer electrode 4 is denoted as $L_1$, the thickness of the barrier dielectric 6 is denoted as $D_1$, $L_2=L_1-D_1$, and the proportional relation between $L_2$ and $D_1$ is $(0.1\sim100):1$, preferably $(0.1\sim30):1$, more preferably $(0.2\sim15):1$.

According to the invention, the outer electrode 4 is preferably disposed on the outer sidewall of the first cavity 1 in a surrounding manner, and the barrier dielectric forms at least part of the sidewall of the first cavity 1.

Figure 1B:
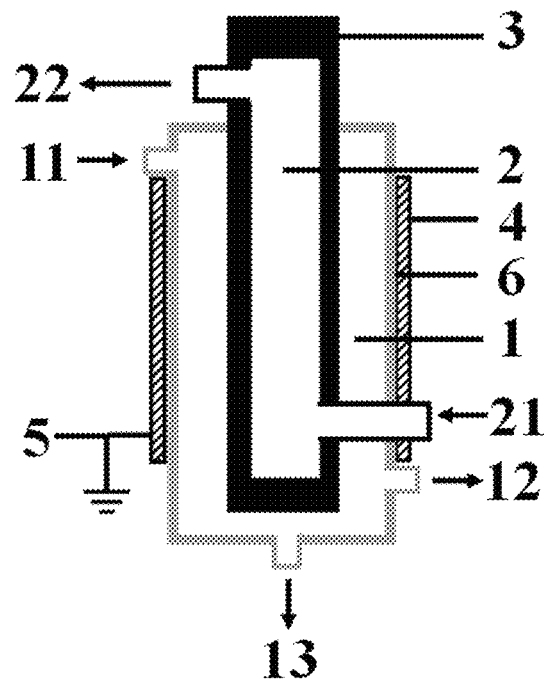
FIG. 1b is a structurally schematic view of a preferred specific embodiment of the low-temperature plasma reaction apparatus provided by the invention, in which a second cavity is disposed inside a first cavity.

The following content in conjunction with FIG. 1b provides the structure of a preferred embodiment of the low-temperature plasma reaction apparatus of the present invention, specifically:
the reaction apparatus has a coaxial jacket cylinder structure, and the reaction apparatus comprises:
a first cavity 1 provided with a first inlet 11 and a first outlet, respectively;
a second cavity 2 nested inside the first cavity 1, and a second inlet 21 and a second outlet 22 are respectively arranged on the second cavity 2;
an inner electrode 3 disposed in the first cavity 1;
an outer electrode 4 forming at least part of the sidewall of the first cavity 1 or is disposed on the outer sidewall of the first cavity 1 in a surrounding manner; and
a barrier dielectric forming at least part of the sidewall of the first cavity 1 or is disposed on the inner sidewall of the first cavity 1 in a surrounding manner, and the barrier dielectric is disposed between the inner electrode 3 and the outer electrode 4 such that a discharge region between the inner electrode 3 and the outer electrode 4 is spaced by the barrier dielectric;
both the inner electrode 3 and the outer electrode 4 are solid electrodes, and the shapes of the inner electrode 3 and the outer electrode 4 are matched with each other to form an isodiametric structure;
the distance between the outer sidewall of the inner electrode 3 and the inner sidewall of the outer electrode 4 is denoted as $L_1$, the thickness of the barrier dielectric 6 is denoted as $D_1$, $L_2=L_1-D_1$, and the proportional relation between $L_2$ and $D_1$ is (0.1~100):1, preferably (0.1~30):1, more preferably (0.2~15):1.

Figure 1C:
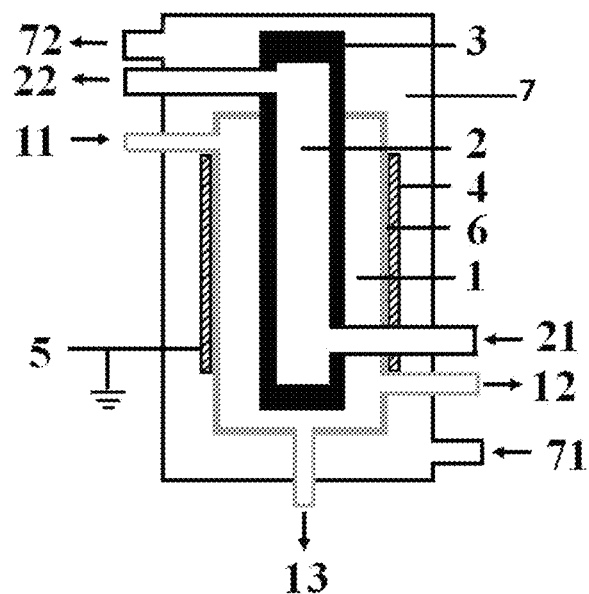
FIG. 1c is a structurally schematic view of a preferred specific embodiment of the low-temperature plasma reaction apparatus provided by the invention, in which a third cavity is disposed, and the second cavity and the third cavity are respectively arranged inside and outside the first cavity.

FIG. 1c illustrates a structure of a preferred embodiment of the low-temperature plasma reaction apparatus of the present invention, the low-temperature plasma reaction apparatus illustrated in FIG. 1c differs from the low-temperature plasma reaction apparatus illustrated in FIG. 1a and FIG. 1b in that: the low-temperature plasma reaction apparatus in FIG. 1c further comprises a third cavity 7, the third cavity 7 and the second cavity 2 are respectively disposed on both sides of the first cavity 1; in addition, a heat-conducting medium is continuously introduced into and discharged from both the third cavity 7 and the second cavity 2. In the third cavity, the heat-conducting medium is introduced into the third cavity from the third inlet 71 and is discharged via the third outlet 72.

Figure 2A:
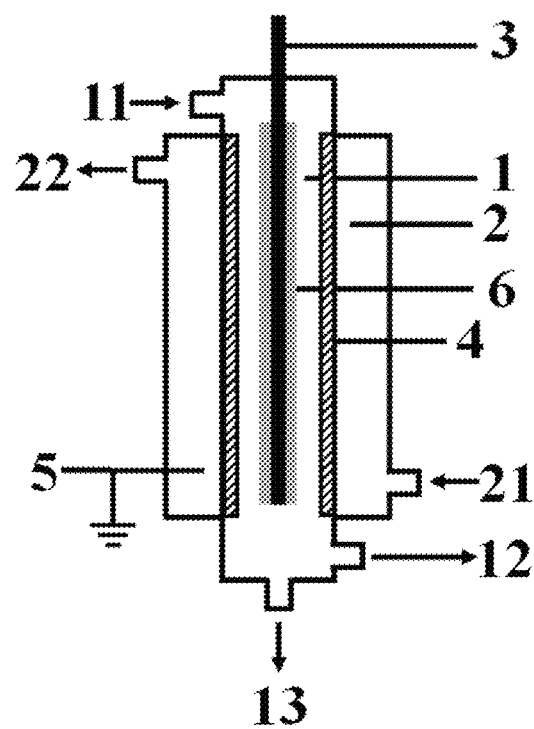
FIG. 2a is a structurally schematic view of another preferred specific embodiment of the low-temperature plasma reaction apparatus provided by the invention, in which a second cavity is disposed outside a first cavity.

The following content in conjunction with FIG. 2a provides the structure of a preferred embodiment of the low-temperature plasma reaction apparatus of the present invention, specifically:
the reaction apparatus has a coaxial jacket cylinder structure, and the reaction apparatus comprises:
a first cavity 1 provided with a first inlet 11 and a first outlet, respectively;
a second cavity 2 nested outside the first cavity 1, and a second inlet 21 and a second outlet 22 are respectively arranged on the second cavity 2;
an inner electrode 3 disposed in the first cavity 1;
an outer electrode 4 forming at least part of the sidewall of the first cavity 1 or is disposed on the inner sidewall of the first cavity 1 in a surrounding manner; and
a barrier dielectric 6 disposed on at least a part of an outer surface of the inner electrode 3 such that the outer surface of the inner electrode 3 at least partially protruding into the first cavity 1 is wrapped with the barrier dielectric 6, and the disposed position of said barrier dielectric 6 causes that a discharge region between the inner electrode and the outer electrode is spaced by the barrier dielectric;
both the inner electrode 3 and the outer electrode 4 are solid electrodes, and the shapes of the inner electrode 3 and the outer electrode 4 are matched with each other to form an isodiametric structure;
the distance between the outer sidewall of the inner electrode 3 and the inner sidewall of the outer electrode 4 is denoted as $L_1$, the thickness of the barrier dielectric 6 is denoted as $D_1$, $L_2=L_1-D_1$, and the proportional relation between $L_2$ and $D_1$ is (0.1~100):1, preferably (0.1~30):1, more preferably (0.2~15):1.

Figure 2B:
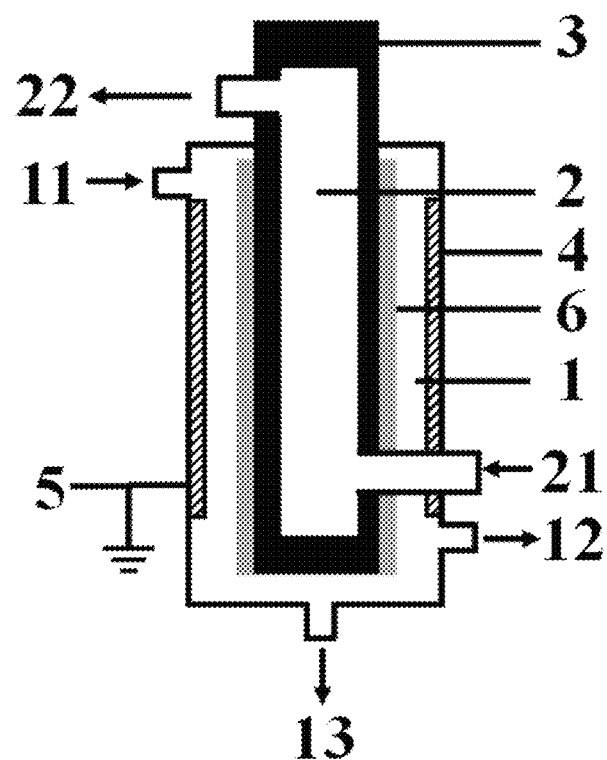
FIG. 2b is a structurally schematic view of another preferred specific embodiment of the low-temperature plasma reaction apparatus provided by the invention, in which a second cavity is disposed inside a first cavity.

The following content in conjunction with FIG. 2b provides the structure of a preferred embodiment of the low-temperature plasma reaction apparatus of the present invention, specifically:
the reaction apparatus has a coaxial jacket cylinder structure, and the reaction apparatus comprises:
a first cavity 1 provided with a first inlet 11 and a first outlet, respectively;
a second cavity 2 nested inside the first cavity 1, and a second inlet 21 and a second outlet 22 are respectively arranged on the second cavity 2;
an inner electrode 3 disposed in the first cavity 1;
an outer electrode 4 forming at least part of the sidewall of the first cavity 1 or is disposed on the inner sidewall of the first cavity 1 in a surrounding manner; and
a barrier dielectric 6 disposed on at least a part of an outer surface of the inner electrode 3 such that the outer surface of the inner electrode 3 at least partially protruding into the first cavity 1 is wrapped with the barrier dielectric 6, and the disposed position of said barrier dielectric 6 causes that a discharge region between the inner electrode and the outer electrode is spaced by the barrier dielectric;
both the inner electrode 3 and the outer electrode 4 are solid electrodes, and the shapes of the inner electrode 3 and the outer electrode 4 are matched with each other to form an isodiametric structure;
the distance between the outer sidewall of the inner electrode 3 and the inner sidewall of the outer electrode 4 is denoted as $L_1$, the thickness of the barrier dielectric 6 is denoted as $D_1$, $L_2=L_1-D_1$, and the proportional relation between $L_2$ and $D_1$ is (0.1~100):1, preferably (0.1~30):1, more preferably (0.2~15):1.

Figure 2C:
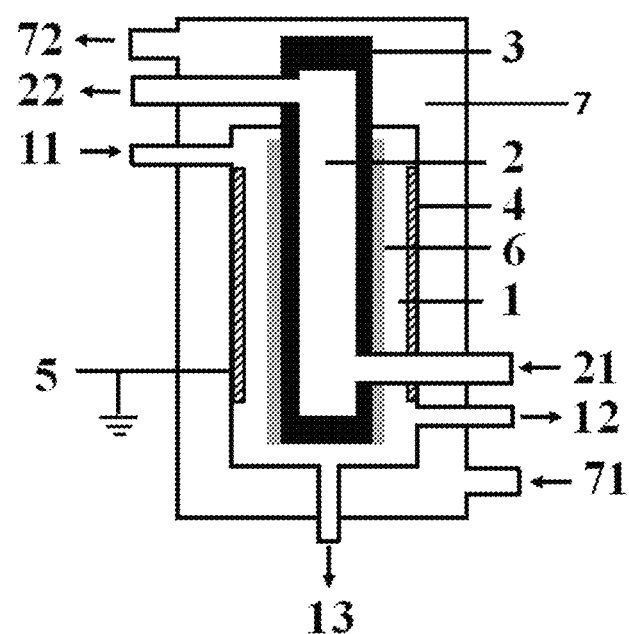
FIG. 2c is a structurally schematic view of another preferred specific embodiment of the low-temperature plasma reaction apparatus provided by the invention, in which a third cavity is disposed, and the second cavity and the third cavity are respectively arranged inside and outside the first cavity.

FIG. 2c illustrates a structure of a preferred embodiment of the low-temperature plasma reaction apparatus of the present invention, the low-temperature plasma reaction apparatus illustrated in FIG. 2c differs from the low-temperature plasma reaction apparatus illustrated in FIG. 2a and FIG. 2b in that: the low-temperature plasma reaction apparatus in FIG. 2c further comprises a third cavity 7, the third cavity 7 and the second cavity 2 are respectively disposed on both sides of the first cavity 1; in addition, a heat-conducting medium is continuously introduced into and discharged from both the third cavity 7 and the second cavity 2. In the third cavity, the heat-conducting medium is introduced into the third cavity from the third inlet 71 and is discharged via the third outlet 72.

Figure 3A:
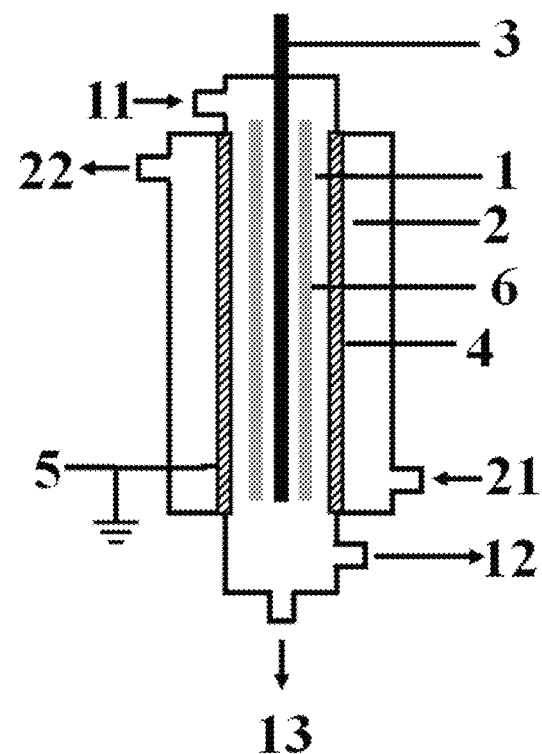
FIG. 3a is a structurally schematic view of another preferred specific embodiment of the low-temperature plasma reaction apparatus provided by the invention, in which a second cavity is disposed outside a first cavity.

The following content in conjunction with FIG. 3a provides the structure of a preferred embodiment of the low-temperature plasma reaction apparatus of the present invention, specifically:
the reaction apparatus has a coaxial jacket cylinder structure, and the reaction apparatus comprises:

a first cavity 1 provided with a first inlet 11 and a first outlet, respectively;

a second cavity 2 nested outside the first cavity 1, and a second inlet 21 and a second outlet 22 are respectively arranged on the second cavity 2;

an inner electrode 3 disposed in the first cavity 1;

an outer electrode 4 forming at least part of the sidewall of the first cavity 1 or is disposed on the outer sidewall of the first cavity 1 in a surrounding manner; and the barrier dielectric 6 is disposed between the inner electrode 3 and the outer electrode 4 in a surrounding manner, both the distance between the barrier dielectric and the inner electrode 3 and the distance between the barrier dielectric and the outer electrode 4 are greater than 0, and the disposed position of said barrier dielectric 6 causes that a discharge region between the inner electrode and the outer electrode is spaced by the barrier dielectric;

both the inner electrode 3 and the outer electrode 4 are solid electrodes, and the shapes of the inner electrode 3 and the outer electrode 4 are matched with each other to form an isodiametric structure;

the distance between the outer sidewall of the inner electrode 3 and the inner sidewall of the outer electrode 4 is denoted as $L_1$, the thickness of the barrier dielectric 6 is denoted as $D_1$, $L_2=L_1-D_1$, and the proportional relation between $L_2$ and $D_1$ is (0.1~100):1, preferably (0.1~30):1, more preferably (0.2~15):1.

Figure 3B:
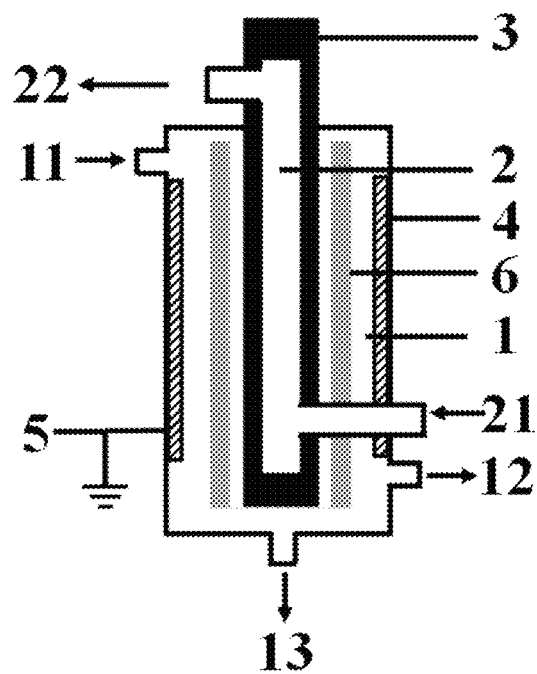
FIG. 3b is a structurally schematic view of another preferred specific embodiment of the low-temperature plasma reaction apparatus provided by the invention, in which a second cavity is disposed inside a first cavity.

The following content in conjunction with FIG. 3b provides the structure of a preferred embodiment of the low-temperature plasma reaction apparatus of the present invention, specifically:

the reaction apparatus has a coaxial jacket cylinder structure, and the reaction apparatus comprises:

a first cavity 1 provided with a first inlet 11 and a first outlet, respectively;

a second cavity 2 nested inside the first cavity 1, and a second inlet 21 and a second outlet 22 are respectively arranged on the second cavity 2;

an inner electrode 3 disposed in the first cavity 1;

an outer electrode 4 forming at least part of the sidewall of the first cavity 1 or is disposed on the inner sidewall of the first cavity 1 in a surrounding manner; and the barrier dielectric 6 is disposed between the inner electrode 3 and the outer electrode 4 in a surrounding manner, both the distance between the barrier dielectric and the inner electrode 3 and the distance between the barrier dielectric and the outer electrode 4 are greater than 0, and the disposed position of said barrier dielectric 6 causes that a discharge region between the inner electrode and the outer electrode is spaced by the barrier dielectric;

both the inner electrode 3 and the outer electrode 4 are solid electrodes, and the shapes of the inner electrode 3 and the outer electrode 4 are matched with each other to form an isodiametric structure;

the distance between the outer sidewall of the inner electrode 3 and the inner sidewall of the outer electrode 4 is denoted as $L_1$, the thickness of the barrier dielectric 6 is denoted as $D_1$, $L_2=L_1-D_1$, and the proportional relation between $L_2$ and $D_1$ is (0.1~100):1, preferably (0.1~30):1, more preferably (0.2~15):1.

Figure 3C:
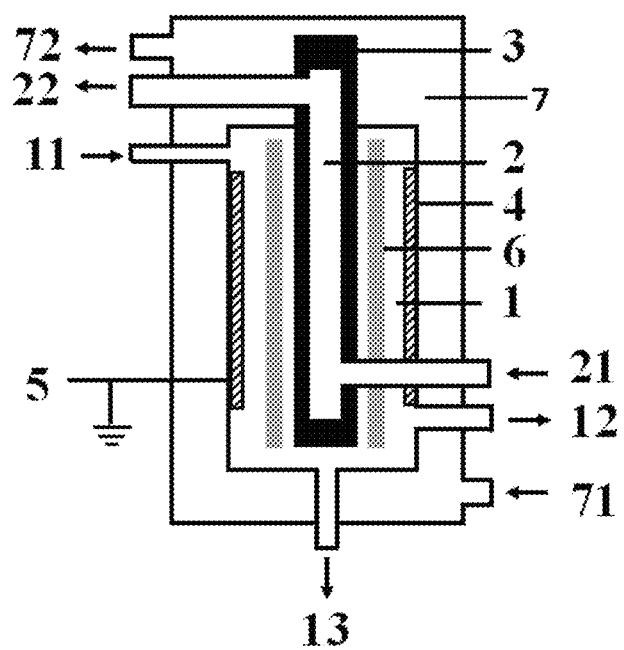
FIG. 3c is a structurally schematic view of another preferred specific embodiment of the low-temperature plasma reaction apparatus provided by the invention, in which a third cavity is disposed, and the second cavity and the third cavity are respectively arranged inside and outside the first cavity.

FIG. 3c illustrates a structure of a preferred embodiment of the low-temperature plasma reaction apparatus of the present invention, the low-temperature plasma reaction apparatus illustrated in FIG. 3c differs from the low-temperature plasma reaction apparatus illustrated in FIG. 3a and FIG. 3b in that: the low-temperature plasma reaction apparatus in FIG. 3c further comprises a third cavity 7, the third cavity 7 and the second cavity 2 are respectively disposed on both sides of the first cavity 1; in addition, a heat-conducting medium is continuously introduced into and discharged from both the third cavity 7 and the second cavity 2. In the third cavity, the heat-conducting medium is introduced into the third cavity from the third inlet 71 and is discharged via the third outlet 72.

Figure 4A:
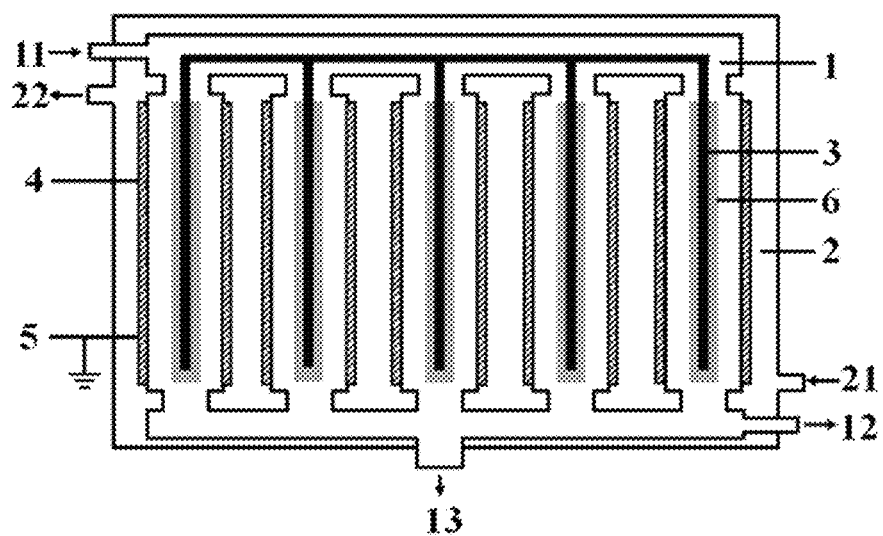
FIG. 4a is a structurally schematic view of another preferred specific embodiment of the low-temperature plasma reaction apparatus provided by the invention, in which a second cavity is disposed outside a first cavity.

The following content in conjunction with FIG. 4a provides the structure of another preferred embodiment of the low-temperature plasma reaction apparatus of the present invention, specifically:

the reaction apparatus has a jacket cylinder structure, and the reaction apparatus comprises:

a first cavity formed by at least two reaction tubes arranged in parallel and having top and bottoms respectively communicating with each other; the first cavity 1 is provided with a first inlet 11 and a first outlet, respectively;

a second cavity 2 nested outside the first cavity 1, and a second inlet 21 and a second outlet 22 are respectively arranged on the second cavity 2;

an inner electrode 3 disposed in each of the reaction tubes, respectively;

an outer electrode 4 forming at least part of the sidewall of each of the reaction tubes or is disposed on the sidewall of each of the reaction tubes in a surrounding manner; and the barrier dielectric 6 is disposed between the inner electrode 3 and the outer electrode 4 in each of the reaction tubes by a surrounding manner, and the disposed position of said barrier dielectric 6 causes that a discharge region between the inner electrode 3 and the outer electrode 4 is spaced by the barrier dielectric;

wherein in each of the reaction tubes, the distance between the outer sidewall of the inner electrode 3 and the inner sidewall of the outer electrode 4 is denoted as $L_1$, the thickness of the barrier dielectric 6 is denoted as $D_1$, $L_2=L_1-D_1$, and the proportional relation between $L_2$ and $D_1$ is (0.1~100):1, preferably (0.1~30):1, more preferably (0.2~15):1.

Figure 4B:
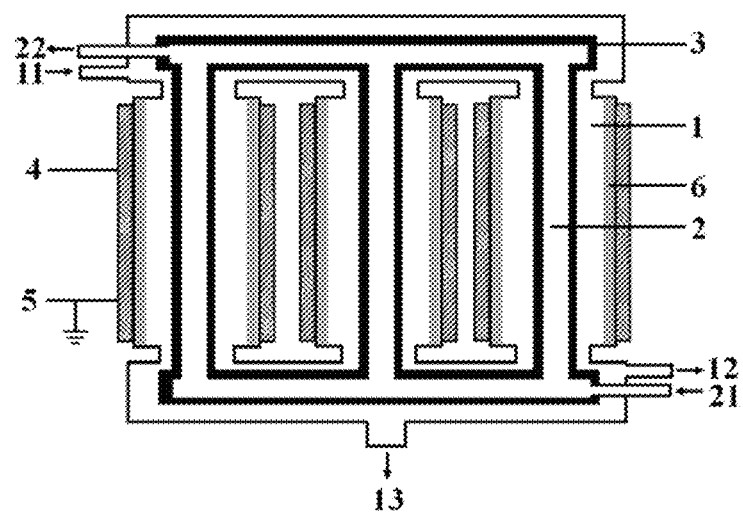
FIG. 4b is a structurally schematic view of another preferred specific embodiment of the low-temperature plasma reaction apparatus provided by the invention, in which a second cavity is disposed inside a first cavity.

The following content in conjunction with FIG. 4b provides the structure of another preferred embodiment of the low-temperature plasma reaction apparatus of the present invention, specifically:

the reaction apparatus has a jacket cylinder structure, and the reaction apparatus comprises:

a first cavity formed by at least two reaction tubes arranged in parallel and having top and bottoms respectively communicating with each other; the first cavity 1 is provided with a first inlet 11 and a first outlet, respectively;

a second cavity 2 nested inside the first cavity 1, and a second inlet 21 and a second outlet 22 are respectively arranged on the second cavity 2;

an inner electrode 3 disposed in each of the reaction tubes, respectively;

an outer electrode 4 forming at least part of the sidewall of each of the reaction tubes or is disposed on the sidewall of each of the reaction tubes in a surrounding manner; and the barrier dielectric 6 is disposed between the inner electrode 3 and the outer electrode 4 in each of the reaction tubes by a surrounding manner, and the disposed position of said barrier dielectric 6 causes that a discharge region between the inner electrode 3 and the outer electrode 4 is spaced by the barrier dielectric;

wherein in each of the reaction tubes, the distance between the outer sidewall of the inner electrode 3 and the inner sidewall of the outer electrode 4 is denoted as $L_1$, the thickness of the barrier dielectric 6 is denoted as $D_1$, $L_2=L_1-D_1$, and the proportional relation between $L_2$ and $D_1$ is (0.1~100):1, preferably (0.1~30):1, more preferably (0.2~15):1.

Figure 4C:
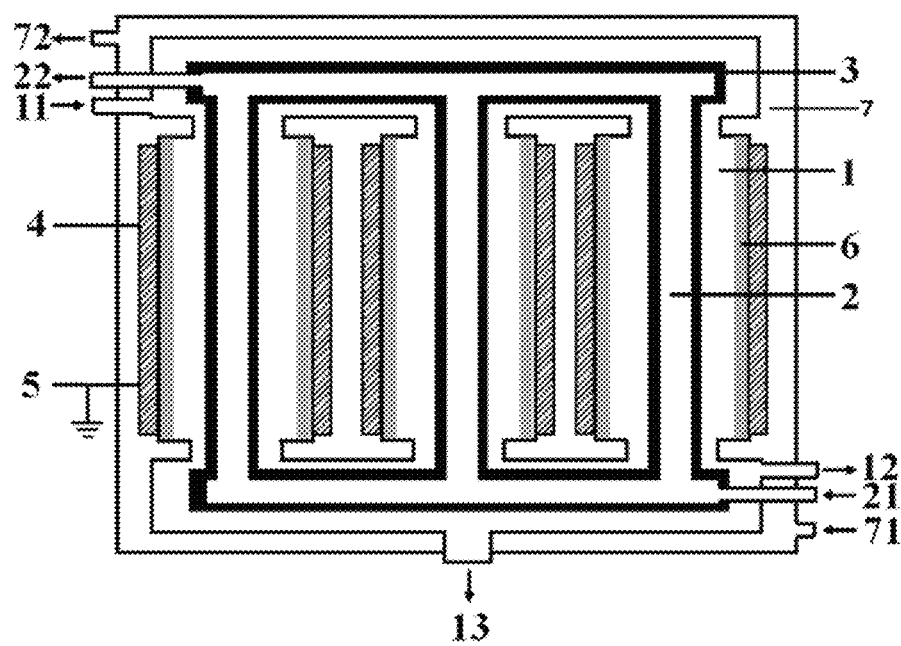
FIG. 4c is a structurally schematic view of another preferred specific embodiment of the low-temperature plasma reaction apparatus provided by the invention, in which a third cavity is disposed, and the second cavity and the third cavity are respectively arranged inside and outside the first cavity.

FIG. 4c illustrates a structure of a preferred embodiment of the low-temperature plasma reaction apparatus of the present invention, the low-temperature plasma reaction apparatus illustrated in FIG. 4c differs from the low-temperature plasma reaction apparatus illustrated in FIG. 4a and FIG. 4b in that: the low-temperature plasma reaction apparatus in FIG. 4c further comprises a third cavity 7, the third cavity 7 and the second cavity 2 are respectively disposed on both sides of the first cavity 1; in addition, a heat-conducting medium is continuously introduced into and discharged from both the third cavity 7 and the second cavity 2. In the third cavity, the heat-conducting medium is introduced into the third cavity from the third inlet 71 and is discharged via the third outlet 72.

In the present invention, when the second cavity 2 or the third cavity 7 is disposed in the first cavity 1, in order to facilitate description, the second cavity 2 or the third cavity 7 disposed in the first cavity 1 is named as an "internal cavity".

Preferably, the inner electrode 3 forms at least part of the sidewall of the internal cavity or is disposed on the sidewall of the internal cavity in a surrounding manner.

According to a preferred specific embodiment, the inner electrode 3 is disposed on the outer sidewall of the third cavity 7 in a surrounding manner.

According to a preferred specific embodiment, the inner electrode 3 is disposed on the inner sidewall of the third cavity 7 in a surrounding manner, and at least a portion of the sidewall of the third cavity 7 is formed by the barrier dielectric 6. That is, in the specific embodiment, the reaction apparatus of the present invention may be a dual barrier dielectric apparatus.

In FIGS. 1a, 1b, 1c, 2a, 2b, 2c, 3a, 3b, 3c, 4a, 4b, and 4c, the following preferable technical features are also provided: the reaction apparatus preferably further comprises a ground lead 5, one end of the ground lead 5 is electrically connected with the inner electrode 3 or the outer electrode 4.

In the present invention, one of the inner electrode 3 and the outer electrode 4 is a grounding electrode, and the other is a high-voltage electrode.

Preferably, the first inlet 11 is disposed at an upper portion of the first cavity 1, and the first outlet is disposed at a lower portion and/or a bottom of the first cavity 1.

Preferably, the second inlet 21 and the second outlet 22 are respectively arranged at a lower portion and an upper portion of the second cavity 2.

It is preferable that the third inlet 71 and the third outlet 72 are respectively arranged at a lower portion and an upper portion of the third cavity 7.

Preferably, in the specific embodiments shown in FIGS. 1a, 1b, 1c, 2a, 2b, 2c, 3a, 3b and 3c, the first outlet comprises a gas product outlet 12 and a liquid product outlet 13, and the gas product outlet 12 is disposed at the lower part of the first cavity 1 and the liquid product outlet 13 is disposed at the bottom of the first cavity 1.

Preferably, in the specific embodiments shown in FIGS. 1a, 1b, 1c, 2a, 2b, 2c, 3a, 3b and 3c, the gas product outlet 12 is disposed below the discharge region, and the proportional relationship between the height $H_1$ of the disposed position of said gas product outlet 12 relative to the bottom of the first cavity 1 and the length $L_3$ of the discharge region is: $H_1:L_3$=1:(0.05~25,000); preferably $H_1:L_3$=1:(0.1~10,000); more preferably $H_1:L_3$=1:(0.5~1,000).

Preferably, in the specific embodiments shown in FIGS. 4a, 4b and 4c, the first outlet comprises a gas product outlet 12 and a liquid product outlet 13, and the gas product outlet 12 is arranged at the lower part of all the reaction tubes, and the liquid product outlet 13 is arranged at the bottom of all the reaction tubes. It is preferable that each of the reaction tubes has the same size Preferably, in the specific embodiments shown in FIGS. 4a, 4b and 4c, the gas product outlet 12 is disposed below all the discharge region, and the proportional relationship between the height $H_1$ of the disposed position of said gas product outlet 12 relative to the bottom of the first cavity 1 and the length $L_3$ of the discharge region is: $H_1:L_3$=1: (0.05~25,000); preferably $H_1:L_3$=1:(0.1~10,000); more preferably $H_1:L_3$=1:(0.5~1,000).

Unless otherwise specified, the pressures in the present invention refer to the absolute pressures.

The low-temperature plasma reaction apparatus provided by the invention also have the following specific advantages:
(1) The reaction apparatus uses a conductive solid material to form the ground lead for grounding, as compared with a liquid grounding electrode, the solid grounding electrode has the advantages that the micro-discharge current generated by discharge is larger when the solid grounding electrode is matched with the structure of the invention, thereby being more conducive to the discharge decomposition reaction of hydrogen sulfide molecules.
(2) The jacket structure is arranged on the outer side and/or the inner side of the electrode of the reaction apparatus, the temperature control of the reaction apparatus may be implemented by controlling the temperature of the heat-conducting medium in the jacket, such that the sulphur generated by the decomposition of hydrogen sulfide discharge can smoothly flow out from the discharge region, the sulphur is prevented from being solidified to block the reaction apparatus, and the discharge process is carried out continuously and stably.
(3) The reaction apparatus controls the proportional relation between $L_2$ and the thickness $D_1$ of the barrier dielectric to be (0.1~100):1, preferably (0.1~30):1, more preferably (0.2~15):1, which is in combination with the other structure of the reaction apparatus in the invention, thus the conversion of the hydrogen sulfide can be obviously improved and the decomposition energy consumption can be reduced.

The present invention will be described in detail by means of the examples. In the following examples, each of the used raw materials is commercially available unless otherwise specified.

The thickness of the barrier dielectrics in the following examples and comparative examples is identical.

The conversion of hydrogen sulfide in the following examples are obtained through calculation according to the following formula:

Conversion of hydrogen sulfide %=mole number of the converted hydrogen sulfide/mole number of initial hydrogen sulfide×100%.

The energy consumption for decomposing hydrogen sulfide in the following examples is measured through detection with an oscilloscope and calculation by using the Lissajous figure.

Example 1

The low-temperature plasma reaction apparatus illustrated in FIG. 1a is used for performing the hydrogen sulfide decomposition reaction, the specific structure and structural parameters of the low-temperature plasma reaction apparatus are shown as follows, the inner electrode in the example is exactly the high-voltage electrode.

The reaction apparatus comprises:

A first cavity 1 provided with a first inlet 11, a gas product outlet 12 and a liquid product outlet 13, respectively, wherein all the sidewall of the first cavity 1 is formed by the barrier dielectric 6, the material forming the barrier dielectric 6 is a hard glass;

a second cavity 2 is nested outside the first cavity 1, and a second inlet 21 and a second outlet 22 are respectively arranged on the second cavity 2;

an inner electrode 3 arranged at the central axis position of the first cavity 1, the material forming the inner electrode 3 is stainless steel, and the inner electrode 3 is connected with a high-voltage power supply;

an outer electrode 4 wrapped on the outer sidewall of the first cavity 1, the material forming the outer electrode 4 is stainless steel metal foil, the outer electrode 4 is grounded, and a lower edge of the inner electrode 3 in the example is lower than that of the outer electrode 4;

the ratio of $L_2$ to the thickness $D_1$ of the barrier dielectric 6 is 6:1; and $H_1:L_3=1:46$;

the volume of the first cavity 1 of the reaction apparatus in the example is 0.2 L.

In the example, the mixed gas enters the first cavity 1 of the reaction apparatus from the upper part of the first cavity 1 of the reaction apparatus, a gas product is discharged via a gas product outlet 12 disposed at the lower part of the first cavity 1 of the reaction apparatus, and elemental sulphur is discharged from a liquid product outlet 13 disposed at the bottom of the reaction apparatus; and the heat-conducting medium of the example is introduced from the lower portion of the second cavity 2 of the reaction apparatus and is discharged from the upper portion of the second cavity 2 of the reaction apparatus.

The operation steps of the low-temperature plasma reaction apparatus are as follows: introducing nitrogen into the first cavity 1 of the low-temperature plasma reaction apparatus from the first inlet 11 to purge air in the discharge region, and discharging the gas via the gas product outlet 12 and the liquid product outlet 13; in the meanwhile, introducing a heat-conducting medium (particularly dimethyl silicone oil) into the second cavity 2 from the second inlet 21, discharging the introduced heat-conducting medium via the second outlet 22, and maintaining the temperature of the heat-conducting medium at 145° C.;

subsequently introducing a $H_2S$/Ar mixed gas into the first cavity 1 of the low-temperature plasma reaction apparatus from the first inlet 11, wherein the volume fraction of $H_2S$ is 20%; controlling the flow rate of the mixed gas such that the average residence time of the gas in the discharge region is 9.5 s, and the reaction pressure in the first cavity 1 of the reactor in the example is kept at 0.03 MPa. After introducing the $H_2S$/Ar mixed gas into the reaction apparatus for 30 minutes, switching on an alternating current (AC) high-voltage power supply, and forming a plasma discharge field between the inner electrode 3 and the solid grounding electrode by adjusting the voltage and frequency of the high-voltage power supply. Wherein the discharge conditions are as follows: the voltage is 16.8 kV, the frequency is 7.5 kHz, and the current is 0.75 A. The hydrogen sulfide gas is ionized in the discharge region and decomposed into hydrogen and elemental sulphur, the elemental sulphur generated by discharge flows down slowly along the first cavity wall, and liquid products are discharged intermittently. The reacted gas flows out from a gas product outlet 12.

Results: the conversion of $H_2S$ is measured to be 73.9% after continuously performing the hydrogen sulfide decomposition reaction of this example for 20 minutes; and no abnormality has been discovered after performing the continuous discharge for 100 hours, both the discharge condition and the $H_2S$ conversion are kept stable. In addition, the decomposition energy consumption of the example is 13 eV/$H_2S$ molecules (the energy consumed by decomposition of 1 molecule of $H_2S$ is 13 eV).

Comparative Example 1

The comparative example employs a low-temperature plasma reaction apparatus similar to that of example 1 to carry out a hydrogen sulfide decomposition reaction, except for the following aspects:

the grounding electrode in the comparative example is a liquid grounding electrode, which is a mixture of LiCl and $AlCl_3$ in a molten state in a molar ratio of 1:1, the liquid grounding electrode is also a heat-conducting medium, it is maintained at a temperature of 145° C., and placed in the second cavity of the reaction apparatus;

the flow rate of the mixture is controlled such that the average residence time of the gas in the discharge region is 18.5 s;

the volume of the first cavity of the reaction apparatus of the comparative example is 0.05 L.

The rest parts of the comparative example are same as those in the example 1.

Moreover, the comparative example uses the same operation method as in example 1 for performing the decomposition reaction of hydrogen sulfide.

Results: the conversion of $H_2S$ is measured to be 15.6% after continuously performing the hydrogen sulfide decomposition reaction of the comparative example for 20 minutes; and the conversion of $H_2S$ is reduced to 5.1% after the continuous discharge for 1.5 hours.

The decomposition energy consumption of the comparative example is 102 eV/$H_2S$ molecules.

Comparative Example 2

The comparative example employs a low-temperature plasma reaction apparatus similar to that of the comparative example 1 to carry out a hydrogen sulfide decomposition reaction, except for the following aspects:

the ratio of $L_2$ to the thickness $D_1$ of the barrier dielectric in the comparative example is 0.08:1;

the flow rate of the mixture is controlled such that the average residence time of the gas in the discharge region is 7.3 s;

the volume of the first cavity of the comparative example is 0.02 L.

The rest parts of the comparative example are same as those in the comparative example 1.

Results: the conversion of $H_2S$ is measured to be 17.1% after continuously performing the hydrogen sulfide decomposition reaction of the comparative example for 20 minutes; and the conversion of $H_2S$ is reduced to 3.9% after the continuous discharge for 1.5 hours.

The decomposition energy consumption of the comparative example is 125 eV/$H_2S$ molecules.

Example 2

The example uses a plasma reaction apparatus similar to that of example 1 to carry out the decomposition reaction of hydrogen sulfide, except for that in this example:
all sidewalls of the first cavity 1 are formed by outer electrode 4, the material forming the outer electrode 4 is stainless steel metal foil, the outer electrode 4 is grounded, and the inner electrode 3 is connected with a high-voltage power supply;
the barrier dielectric 6 is disposed on the inner sidewall of the first cavity 1 in a surrounding manner;
the ratio of $L_2$ to the thickness $D_1$ of the barrier dielectric 6 is 20:1; and $H_1:L_3=1:100$.

In the example, a $H_2S/Ar$ mixed gas is introduced into a first cavity 1 of the low-temperature plasma reaction apparatus from a first inlet 11, wherein the volume fraction of $H_2S$ is 30%, the flow rate of the mixed gas is controlled such that the average residence time of the gas in a discharge region is 7.8 s, and the reaction pressure in the first cavity 1 of the reactor in the example is kept at 0.04 MPa. After introducing the $H_2S/Ar$ mixed gas into the reaction apparatus for 30 minutes, an AC high-voltage power supply is switched on, and a plasma discharge field is formed between the inner electrode 3 and the solid grounding electrode by adjusting the voltage and frequency of the high-voltage power supply. Wherein the discharge conditions are as follows: the voltage is 19.8 kV, the frequency is 10.5 kHz, and the current is 1.25 A.

The rest parts of the example are same as those in the example 1.

Results: the conversion of $H_2S$ is measured to be 72.8% after continuously performing the hydrogen sulfide decomposition reaction of the example for 20 minutes; and no abnormality has been discovered after performing the continuous discharge for 100 hours, both the discharge condition and the $H_2S$ conversion are kept stable. In addition, the decomposition energy consumption of the example is 14.2 eV/$H_2S$ molecules.

Example 3

The example uses a plasma reaction apparatus similar to that of example 1 to carry out the decomposition reaction of hydrogen sulfide, except for that in this example:
all sidewalls of the first cavity 1 are formed by outer electrode 4, the material forming the outer electrodes 4 is copper foil, the outer electrode 4 is grounded, and the inner electrode 3 is connected with a high-voltage power supply;
the barrier dielectric 6 is disposed on the inner sidewall of the first cavity 1 in a surrounding manner;
the ratio of $L_2$ to the thickness $D_1$ of the barrier dielectric 6 is 0.5:1; and $H_1:L_3=1:200$.

In the example, a $H_2S/Ar$ mixed gas is introduced into a first cavity 1 of the low-temperature plasma reaction apparatus from a first inlet 11, wherein the volume fraction of $H_2S$ is 25%, the flow rate of the mixed gas is controlled such that the average residence time of the gas in a discharge region is 10.3 s, and the reaction pressure in the first cavity 1 of the reactor in the example is kept at 0.05 MPa. After introducing the $H_2S/Ar$ mixed gas into the reaction apparatus for 30 minutes, an AC high-voltage power supply is switched on, and a plasma discharge field is formed between the inner electrode 3 and the solid grounding electrode by adjusting the voltage and frequency of the high-voltage power supply. Wherein the discharge conditions are as follows: the voltage is 12.8 kV, the frequency is 4.7 kHz, and the current is 1.12 A.

The rest parts of the example are same as those in the example 1.

Results: the conversion of $H_2S$ is measured to be 73.2% after continuously performing the hydrogen sulfide decomposition reaction of the example for 20 minutes; and no abnormality has been discovered after performing the continuous discharge for 100 hours, both the discharge condition and the $H_2S$ conversion are kept stable. In addition, the decomposition energy consumption of the example is 14.8 eV/$H_2S$ molecules.

Example 4

This example uses a plasma reaction apparatus similar to that of example 1 to carry out the decomposition reaction of hydrogen sulfide, except for that in this example: the ratio of $L_2$ to the thickness $D_1$ of the barrier dielectric 6 is 35:1.

The rest parts of the example are same as those in the example 1.

Results: the conversion of $H_2S$ is measured to be 71.6% after continuously performing the hydrogen sulfide decomposition reaction of the example for 20 minutes; and no abnormality has been discovered after performing the continuous discharge for 100 hours, both the discharge condition and the $H_2S$ conversion are kept stable. In addition, the decomposition energy consumption of the example is 22.3 eV/$H_2S$ molecules.

Example 5

The plasma reaction apparatus illustrated in FIG. 2a is used for performing hydrogen sulfide decomposition reaction, and the specific structure and structural parameters of the plasma reaction apparatus are shown as follows:
the reaction apparatus comprises:
a first cavity 1 provided with a first inlet 11, a gas product outlet 12 and a liquid product outlet 13, respectively;
a second cavity 2 nested outside the first cavity 1, and a second inlet 21 and a second outlet 22 are respectively arranged on the second cavity 2;
an inner electrode 3 arranged at the central axis position of the first cavity 1, the material forming the inner electrode 3 is stainless steel, and the inner electrode 3 is connected with a high-voltage power supply;
an outer electrode 4 disposed on an inner sidewall of the first cavity 1, the material forming the outer electrode 4 is stainless steel metal foil, the outer electrode 4 is grounded, and a lower edge of the inner electrode 3 in the example is lower than a lower edge of the solid grounding electrode;
a barrier dielectric 6 arranged on the outer surface of the inner electrode 3 and the part of inner electrode 3 which extending into the first cavity 1 is covered by barrier dielectric 6, the upper edge of the barrier dielectric 6 is higher than that of the solid grounding electrode, and the material forming the barrier dielectric 6 is hard glass.

The ratio of $L_2$ to the thickness $D_1$ of the barrier dielectric 6 is 8:1; and $H_1:L_3=1:40$;
the volume of the first cavity 1 of the reaction apparatus in the example is 0.2 L.

In the example, the mixed gas enters the first cavity 1 of the reaction apparatus from the upper part of the first cavity 1 of the reaction apparatus, a gas product is discharged via a gas product outlet 12 disposed at the lower part of the first cavity 1 of the reaction apparatus, and elemental sulphur is discharged from a liquid product outlet 13 disposed at the bottom of the reaction apparatus; and the heat-conducting medium of the present embodiment is introduced from the lower portion of the second cavity 2 of the reaction apparatus and is discharged from the upper portion of the second cavity 2 of the reaction apparatus.

The operation steps of the plasma reaction apparatus are as follows:
introducing nitrogen into the first cavity 1 of the low-temperature plasma reaction apparatus from the first inlet 11 to purge air in the discharge region, and discharging the gas via the gas product outlet 12 and the liquid product outlet 13; in the meanwhile, introducing a heat-conducting medium (particularly dimethyl silicone oil) into the second cavity 2 from the second inlet 21, discharging the introduced heat-conducting medium via the second outlet 22, and maintaining the temperature of the heat-conducting medium at 145° C.

Subsequently introducing a $H_2S/Ar$ mixed gas into the first cavity 1 of the low-temperature plasma reaction apparatus from the first inlet 11, wherein the volume fraction of $H_2S$ is 20%; controlling the flow rate of the mixed gas such that the average residence time of the gas in the discharge region is 9.2 s, and the reaction pressure in the first cavity 1 of the reactor in the example is kept at 0.03 MPa. After introducing the $H_2S/Ar$ mixed gas into the reaction apparatus for 30 minutes, switching on the AC high-voltage power supply, and forming a plasma discharge field between the inner electrode 3 and the solid grounding electrode by adjusting the voltage and frequency of the high-voltage power supply. Wherein the discharge conditions are as follows: the voltage is 18.5 kV, the frequency is 1.5 kHz, and the current is 1.05 A. The hydrogen sulfide gas is ionized in the discharge region and decomposed into hydrogen and elemental sulphur, the elemental sulphur generated by discharge flows down slowly along the first cavity wall and flows out from the liquid product outlet 13. The reacted gas flows out from a gas product outlet 12.

Results: the conversion of $H_2S$ is measured to be 74.2% after continuously performing the hydrogen sulfide decomposition reaction of this example for 20 minutes; and no abnormality has been discovered after performing the continuous discharge for 100 hours, both the discharge condition and the $H_2S$ conversion are kept stable. In addition, the decomposition energy consumption of the example is 12.5 eV/$H_2S$ molecules (the energy consumed by decomposition of 1 molecule of $H_2S$ is 12.5 eV).

Comparative Example 3

This comparative example employs a plasma reaction apparatus similar to that of example 5 to carry out a hydrogen sulfide decomposition reaction, except for the following aspects:
the grounding electrode in the comparative example is a liquid grounding electrode, which is a mixture of LiCl and $AlCl_3$ in a molten state in a molar ratio of 1:1, the liquid grounding electrode is also a heat-conducting medium, it is maintained at a temperature of 145° C., and placed in the second cavity of the reaction apparatus;
the flow rate of the mixture is controlled such that the average residence time of the gas in the discharge region is 20.1 s;
the volume of the first cavity of the reaction apparatus of the comparative example is 0.05 L.
The rest parts of the comparative example are same as those in the example 5.

Moreover, the comparative example uses the same operation method as in example 5 for performing the decomposition reaction of hydrogen sulfide.

Results: the conversion of $H_2S$ is measured to be 16.0% after continuously performing the hydrogen sulfide decomposition reaction of the comparative example for 20 minutes; and the conversion of $H_2S$ is reduced to 6.3% after the continuous discharge for 1.5 hours.

The decomposition energy consumption of this comparative example is 105 eV/$H_2S$ molecules.

Comparative Example 4

The comparative example employs a plasma reaction apparatus similar to that of the comparative example 3 to carry out a hydrogen sulfide decomposition reaction, except for the following aspects:
the ratio of $L_2$ to the thickness $D_1$ of the barrier dielectric in the comparative example is 0.08:1;
the flow rate of the mixture is controlled such that the average residence time of the gas in the discharge region is 17.3 s;
the volume of the first cavity of the comparative example is 0.02 L.
The rest parts of the comparative example are same as those in the comparative example 3.

Results: the conversion of $H_2S$ is measured to be 19.5% after continuously performing the hydrogen sulfide decomposition reaction of the comparative example for 20 minutes; and the conversion of $H_2S$ is reduced to 4.7% after the continuous discharge for 1.5 hours.

The decomposition energy consumption of the comparative example is 135 eV/$H_2S$ molecules.

Example 6

The example uses a plasma reaction apparatus similar to that of example 5 to carry out the decomposition reaction of hydrogen sulfide, except for that in this example:
all sidewall of the first cavity 1 is formed by outer electrode 4, the material forming the outer electrode 4 is stainless steel metal foil, the outer electrode 4 is grounded, and the inner electrode 3 is connected with a high-voltage power supply; the ratio of $L_2$ to the thickness $D_1$ of the barrier dielectric 6 is 25:1; and $H_1:L_3$=1:120.

In the example, a $H_2S/Ar$ mixed gas is introduced into a first cavity 1 of the plasma reaction apparatus from a first inlet 11, wherein the volume fraction of $H_2S$ is 30%, the flow rate of the mixed gas is controlled such that the average residence time of the gas in a discharge region is 8.5 s, and the reaction pressure in the first cavity 1 of the reactor in the example is kept at 0.04 MPa. After introducing the $H_2S/Ar$ mixed gas into the reaction apparatus for 30 minutes, an AC high-voltage power supply is switched on, and a plasma discharge field is formed between the inner electrode 3 and the solid grounding electrode by adjusting the voltage and frequency of the high-voltage power supply. Wherein the discharge conditions are as follows: the voltage is 19.5 kV, the frequency is 5.5 kHz, and the current is 1.45 A.

The rest parts of the example are same as those in the example 5.

Results: the conversion of $H_2S$ is measured to be 73.5% after continuously performing the hydrogen sulfide decomposition reaction of the example for 20 minutes; and no abnormality has been discovered after performing the continuous discharge for 100 hours, both the discharge condition and the H₂S conversion are kept stable. In addition, the decomposition energy consumption of the example is 13.2 eV/H₂S molecules.

Example 7

The example uses a plasma reaction apparatus similar to that of example 5 to carry out the decomposition reaction of hydrogen sulfide, except for that in this example:
The outer electrode 4 is arranged on the inner sidewall of the first cavity 1, the material forming the outer electrode 4 is copper foil, the outer electrode 4 is grounded, and the inner electrode 3 is connected with a high-voltage power supply; the barrier dielectric 6 is arranged on the outer surface of the inner electrode 3 and part of inner electrode 3 which extending into the first cavity 1 is covered by barrier dielectric 6, the upper edge of the barrier dielectric 6 is higher than that of the outer electrode 4, and the material forming the barrier dielectric 6 is ceramic;
the ratio of $L_2$ to the thickness $D_1$ of the barrier dielectric 6 is 0.7:1; and $H_1:L_2=1:250$.

In the example, a H₂S/Ar mixed gas is introduced into a first cavity 1 of the low-temperature plasma reaction apparatus from a first inlet 11, wherein the volume fraction of H₂S is 25%, the flow rate of the mixed gas is controlled such that the average residence time of the gas in a discharge region is 12.5 s, and the reaction pressure in the first cavity 1 of the reactor in the example is kept at 0.05 MPa. After introducing the H₂S/Ar mixed gas into the reaction apparatus for 30 minutes, an AC high-voltage power supply is switched on, and a plasma discharge field is formed between the inner electrode 3 and the solid grounding electrode by adjusting the voltage and frequency of the high-voltage power supply. Wherein the discharge conditions are as follows: the voltage is 8.5 kV, the frequency is 2.5 kHz, and the current is 1.08 A.

The rest parts of the example are same as those in the example 5.

Results: the conversion of H₂S is measured to be 73.8% after continuously performing the hydrogen sulfide decomposition reaction of the example for 20 minutes; and no abnormality has been discovered after performing the continuous discharge for 100 hours, both the discharge condition and the H₂S conversion are kept stable. In addition, the decomposition energy consumption of the example is 13.8 eV/H₂S molecules.

Example 8

This example uses a plasma reaction apparatus similar to that of example 5 to carry out the decomposition reaction of hydrogen sulfide, except for that in this example: the ratio of $L_2$ to the thickness $D_1$ of the barrier dielectric 6 is 35:1.

The rest parts of the example are same as those in the example 5.

Results: the conversion of H₂S is measured to be 71.0% after continuously performing the hydrogen sulfide decomposition reaction of the example for 20 minutes; and no abnormality has been discovered after performing the continuous discharge for 100 hours, both the discharge condition and the H₂S conversion are kept stable. In addition, the decomposition energy consumption of the example is 23.8 eV/H₂S molecules.

Example 9

The low-temperature plasma reaction apparatus illustrated in FIG. 3a is used for performing hydrogen sulfide decomposition reaction, and the specific structure and structural parameters of the low-temperature plasma reaction apparatus are shown as follows:
the reaction apparatus comprises:
a first cavity 1 provided with a first inlet 11, a gas product outlet 12 and a liquid product outlet 13, respectively, wherein the sidewall of the first cavity 1 is formed by an outer electrode 4, the material forming the outer electrode 4 is stainless steel metal foil, and the outer electrode 4 is grounded;
a second cavity 2 nested outside the first cavity 1, and a second inlet 21 and a second outlet 22 are respectively arranged on the second cavity 2;
an inner electrode 3 arranged at the central axis position of the first cavity 1, the material forming the inner electrode 3 is stainless steel, and the inner electrode 3 is connected with a high-voltage power supply;
the lower edge of the inner electrode 3 in this example is lower than the lower edge of the solid grounding electrode;
a barrier dielectric 6, the material forming the barrier dielectric 6 is hard glass;
the ratio of $L_2$ to the thickness $D_1$ of the barrier dielectric 6 is 6:1; and $H_1:L_3=1:46$;
the volume of the first cavity 1 of the reaction apparatus in the example is 0.2 L.

In the example, the mixed gas enters the first cavity 1 of the reaction apparatus from the upper part of the first cavity of the reaction apparatus, a gas product is discharged via a gas product outlet 12 disposed at the lower part of the first cavity 1 of the reaction apparatus, and elemental sulphur is discharged from a liquid product outlet 13 disposed at the bottom of the reaction apparatus; and the heat-conducting medium of the present embodiment is introduced from the lower portion of the second cavity 2 of the reaction apparatus and is discharged from the upper portion of the second cavity 2 of the reaction apparatus.

The operation steps of the low-temperature plasma reaction apparatus are as follows: introducing nitrogen into the first cavity 1 of the low-temperature plasma reaction apparatus from the first inlet 11 to purge air in the discharge region, and discharging the gas via the gas product outlet 12 and the liquid product outlet 13; in the meanwhile, introducing a heat-conducting medium (particularly dimethyl silicone oil) into the second cavity 2 from the second inlet 21, discharging the introduced heat-conducting medium via the second outlet 22, and maintaining the temperature of the heat-conducting medium at 145° C.

Subsequently introducing a H₂S/Ar mixed gas into the first cavity 1 of the low-temperature plasma reaction apparatus from the first inlet 11, wherein the volume fraction of H₂S is 20%; controlling the flow rate of the mixed gas such that the average residence time of the gas in the discharge region is 11.2 s, and the reaction pressure in the first cavity 1 of the reactor in the example is kept at 0.03 MPa. After introducing the H₂S/Ar mixed gas into the reaction apparatus for 30 minutes, switching on the AC high-voltage power supply, and forming a plasma discharge field between the inner electrode 3 and the solid grounding electrode by adjusting the voltage and frequency of the high-voltage power supply. Wherein the discharge conditions are as follows: the voltage is 17.2 kV, the frequency is 8.5 kHz, and the current is 0.80 A. The hydrogen sulfide gas is ionized in the discharge region and decomposed into hydrogen and elemental sulphur, the elemental sulphur generated by discharge flows down slowly along the first cavity wall and flows out intermittently from the liquid product outlet 13. The reacted gas flows out from a gas product outlet 12.

Results: the conversion of $H_2S$ is measured to be 74.1% after continuously performing the hydrogen sulfide decomposition reaction of this example for 20 minutes; and no abnormality has been discovered after performing the continuous discharge for 100 hours, both the discharge condition and the $H_2S$ conversion are kept stable. In addition, the decomposition energy consumption of the example is 13.2 eV/$H_2S$ molecules (the energy consumed by decomposition of 1 molecule of $H_2S$ is 13.2 eV).

Comparative Example 5

This comparative example employs a low-temperature plasma reaction apparatus similar to that of example 9 to carry out the hydrogen sulfide decomposition reaction, except for the following aspects:
the grounding electrode in the comparative example is a liquid grounding electrode, which is a mixture of LiCl and $AlCl_3$ in a molten state in a molar ratio of 1:1, the liquid grounding electrode is also a heat-conducting medium, it is maintained at a temperature of 145° C., and placed in the second cavity of the reaction apparatus;
the flow rate of the mixture is controlled such that the average residence time of the gas in the discharge region is 18.5 s;
the volume of the first cavity of the reaction apparatus of this comparative example is 0.05 L.
The rest parts of the comparative example are same as those in the example 9.
Moreover, the comparative example uses the same operation method as in example 9 for performing the decomposition reaction of hydrogen sulfide.
Results: the conversion of $H_2S$ is measured to be 15.4% after continuously performing the hydrogen sulfide decomposition reaction of the comparative example for 20 minutes; and the conversion of $H_2S$ is reduced to 5.0% after the continuous discharge for 1.5 hours.
The decomposition energy consumption of this comparative example is 104 eV/$H_2S$ molecules.

Comparative Example 6

The comparative example employs a low-temperature plasma reaction apparatus similar to that of the comparative example 5 to carry out a hydrogen sulfide decomposition reaction, except for the following aspects:
the ratio of $L_2$ to the thickness $D_1$ of the barrier dielectric in the comparative example is 0.08:1;
the flow rate of the mixture is controlled such that the average residence time of the gas in the discharge region is 16.9 s;
the volume of the first cavity of the present comparative example is 0.02 L.
The rest parts of the comparative example are same as those in the comparative example 5.
Results: the conversion of $H_2S$ is measured to be 19.4% after continuously performing the hydrogen sulfide decomposition reaction of the comparative example for 20 minutes; and the conversion of $H_2S$ is reduced to 5.1% after the continuous discharge for 1.5 hours.
The decomposition energy consumption of the comparative example is 147 eV/$H_2S$ molecules.

Example 10

The example uses a plasma reaction apparatus similar to that of example 9 to carry out the decomposition reaction of hydrogen sulfide, except for that in this example:
the outer electrode 4 is arranged on the inner sidewall of the first cavity 1, the material forming the outer electrode 4 is stainless steel metal foil, the outer electrode 4 is grounded, and the inner electrode 3 is connected with a high-voltage power supply;
the ratio of $L_2$ to the thickness $D_1$ of the barrier dielectric 6 is 20:1; and $H_1:L_3$=1:300.
In the example, a $H_2S$/Ar mixed gas is introduced into a first cavity 1 of the plasma reaction apparatus from a first inlet 11, wherein the volume fraction of $H_2S$ is 30%, the flow rate of the mixed gas is controlled such that the average residence time of the gas in a discharge region is 9.6 s, and the reaction pressure in the first cavity 1 of the reactor in the example is kept at 0.04 MPa. After introducing the $H_2S$/Ar mixed gas into the reaction apparatus for 30 minutes, an AC high-voltage power supply is switched on, and a plasma discharge field is formed between the inner electrode 3 and the solid grounding electrode by adjusting the voltage and frequency of the high-voltage power supply. Wherein the discharge conditions are as follows: the voltage is 18.5 kV, the frequency is 10.5 kHz, and the current is 1.05 A.
The rest parts of the example are same as those in the example 9.
Results: the conversion of $H_2S$ is measured to be 73.4% after continuously performing the hydrogen sulfide decomposition reaction of the example for 20 minutes; and no abnormality has been discovered after performing the continuous discharge for 100 hours, both the discharge condition and the $H_2S$ conversion are kept stable. In addition, the decomposition energy consumption of the example is 14.1 eV/$H_2S$ molecules.

Example 11

The low-temperature plasma reaction apparatus illustrated in FIG. 4a is used for performing hydrogen sulfide decomposition reaction, and the specific structure and structural parameters of the low-temperature plasma reaction apparatus are shown as follows:
the reaction apparatus comprises:
a first cavity 1 provided with a reactor inlet 11, a gas product outlet 12 and a liquid product outlet 13, respectively, four reaction tubes are arranged in parallel in the first cavity 1, the top and the bottom of each reaction tube are respectively communicated correspondingly, such that the raw materials feeding from the reactor inlet can enter into each reaction tube respectively, the gaseous products generated in each reaction tube can be discharged via the gas product outlet 12, and the liquid products generated in each reaction tube can be discharged via the liquid product outlet 13, the four reaction tubes are completely identical in size, all sidewalls of the reaction tubes are formed by barrier dielectric 6, and the material forming the barrier dielectric 6 is hard glass;
a second cavity 2 nested outside the first cavity 1, a second inlet 21 and a second outlet 22 are respectively arranged on the second cavity 2, the heat-conducting medium introduced from the second inlet 21 can be distributed among the reaction tubes of the first cavity 1, and the heat-conducting medium is discharged via the second outlet 22;
inner electrodes 3 respectively arranged at the central axis positions of the reaction tubes, the material forming the inner electrodes 3 is stainless steel, the inner electrodes 3 in the reaction tubes are connected in parallel, and the inner electrodes 3 are connected with a high-voltage power supply;
outer electrodes 4 respectively arranged on the outer sidewalls of the reaction tubes in a surrounding manner, the material forming the outer electrodes 4 is stainless steel metal foil, the outer electrodes 4 are grounded, and the lower edges of the inner electrodes 3 in the example are flush with the lower edges of the outer electrodes 4.

The ratio of $L_2$ to the thickness $D_1$ of the barrier dielectric 6 is 8:1; and $H_1:L_3=1:32$;

The volume of the first cavity 1 of the entire reactor in this example is 1 L.

In the embodiment, the mixed gas enters the first cavity 1 of the reactor from the upper part of the first cavity 1 of the reactor, a gas product is discharged via a gas product outlet 12 disposed at the lower part of the first cavity 1 of the reactor, and elemental sulphur is discharged from a liquid product outlet 13 disposed at the bottom of the reactor; and the heat-conducting medium of the present embodiment is introduced from the lower portion of the second cavity 2 of the reactor and is discharged from the upper portion of the second cavity 2 of the reactor.

Operation Steps:

introducing nitrogen into the first cavity 1 of the high-flux low-temperature plasma reactor from the reactor inlet to purge air in the discharge region, and discharging the gas from the gas product outlet 12 and the liquid product outlet 13; in the meanwhile, introducing a heat-conducting medium (particularly dimethyl silicone oil) into the second cavity 2 from the second inlet 21, discharging the introduced heat-conducting medium via the second outlet 22, and maintaining the temperature of the heat-conducting medium at 145° C.;

subsequently introducing a $H_2S$/Ar mixed gas into the first cavity 1 of the high-flux low-temperature plasma reactor from the reactor inlet, wherein the volume fraction of $H_2S$ is 65%; controlling the flow rate of the mixed gas such that the average residence time of the gas in the discharge region is 9.7 s, and the reaction pressure in the first cavity 1 of the reactor in the example is kept at 0.15 MPa. After introducing the $H_2S$/Ar mixed gas into the reactor for 30 minutes, switching on an AC high-voltage power supply, and forming a plasma discharge field between the inner electrode 3 and the solid grounding electrode by adjusting the voltage and the frequency of the high-voltage power supply. Wherein the discharge conditions are as follows: the voltage is 13.8 kV, the frequency is 0.8 kHz, and the current is 2.2 A. The hydrogen sulfide gas is ionized in the discharge region and decomposed into hydrogen and elemental sulphur, the elemental sulphur generated by discharge flows down slowly along the first cavity wall and flows out from the liquid product outlet 13. The reacted gas flows out from a gas product outlet 12.

Results: the conversion of $H_2S$ is measured to be 73.6% after continuously performing the hydrogen sulfide decomposition reaction of this example for 20 minutes; and no abnormality has been discovered after performing the continuous discharge for 100 hours, both the discharge condition and the $H_2S$ conversion are kept stable. In addition, the decomposition energy consumption of the example is 14.2 eV/$H_2S$ molecules (the energy consumed by decomposition of 1 molecule of $H_2S$ is 14.2 eV).

Comparative Example 7

This comparative example employs a low-temperature plasma reaction apparatus similar to that of example 11 for the hydrogen sulfide decomposition reaction, except for the following aspects:

the grounding electrode in the comparative example is a liquid grounding electrode, which is a mixture of LiCl and $AlCl_3$ in a molten state in a molar ratio of 1:1, the liquid grounding electrode is also a heat-conducting medium, it is maintained at a temperature of 145° C., and placed in the second cavity of the reaction apparatus;

the flow rate of the mixture is controlled such that the average residence time of the gas in the discharge region is 20.5 s;

the volume of the first cavity of the reaction apparatus of this comparative example is 0.05 L.

The rest parts of the comparative example are same as those in the example 11.

Moreover, the comparative example uses the same operation method as in example 11 for performing the decomposition reaction of hydrogen sulfide.

Results: the conversion of $H_2S$ is measured to be 14.9% after continuously performing the hydrogen sulfide decomposition reaction of the comparative example for 20 minutes; and the conversion of $H_2S$ is reduced to 6.9% after the continuous discharge for 1.5 hours.

The decomposition energy consumption of this comparative example is 111 eV/$H_2S$ molecules.

Comparative Example 8

The comparative example employs a low-temperature plasma reaction apparatus similar to that of the comparative example 7 to carry out a hydrogen sulfide decomposition reaction, except for the following aspects:

the ratio of $L_2$ to the thickness $D_1$ of the barrier dielectric in the comparative example is 0.08:1;

the flow rate of the mixture is controlled such that the average residence time of the gas in the discharge region is 18.4 s;

the volume of the first cavity of the present comparative example is 0.02 L.

The rest parts of the comparative example are same as those in the comparative example 7.

Results: the conversion of $H_2S$ is measured to be 21.7% after continuously performing the hydrogen sulfide decomposition reaction of the comparative example for 20 minutes; and the conversion of $H_2S$ is reduced to 7.8% after the continuous discharge for 1.5 hours.

The decomposition energy consumption of this comparative example is 151 eV/H2S molecule.

Example 12

This example uses a plasma reaction apparatus similar to that of example 11 to carry out the decomposition reaction of hydrogen sulfide, except for that in this example:

the ratio of $L_2$ to the thickness $D_1$ of the barrier dielectric 6 is 35:1.

The rest parts of the example are same as those in the example 11.

Results: the conversion of $H_2S$ is measured to be 67.2% after continuously performing the hydrogen sulfide decomposition reaction of the example for 20 minutes; and no abnormality has been discovered after performing the continuous discharge for 100 hours, both the discharge condition and the $H_2S$ conversion are kept stable. In addition, the decomposition energy consumption of the example is 23.6 eV/$H_2S$ molecules.

Example 13

The hydrogen sulfide decomposition reaction is performed by using the low-temperature plasma reaction apparatus illustrated in FIG. 1b, and the low-temperature plasma reaction apparatus of this example differs from the low-temperature plasma reaction apparatus shown in FIG. 1a of the example 1 in the following aspects:

in this example, the second cavity 2 is disposed inside the first cavity 1, and sidewalls of the first cavity 1 are formed by a barrier dielectric 6, the outer electrode 4 is disposed at an outer sidewall of the first cavity 1 in a surrounding manner, the material forming the outer electrode 4 is a stainless steel metal foil, and the outer electrode 4 is grounded;

all sidewall of the second cavity 2 is formed by inner electrode 3, the material forming the inner electrode 3 is stainless steel, and the inner electrode 3 is connected with a high-voltage power supply;

the ratio of $L_2$ to the thickness $D_1$ of the barrier dielectric 6 is 20:1; and $H_1:L_3=1:100$.

The rest parts of the specific structure and structural parameters of this example are same with those in the example 1.

In the example, a $H_2S/Ar$ mixed gas is introduced into a first cavity 1 of the low-temperature plasma reaction apparatus from a first inlet 11, wherein the volume fraction of $H_2S$ is 30%, the flow rate of the mixed gas is controlled such that the average residence time of the gas in a discharge region is 16.7 s, and the reaction pressure in the first cavity 1 of the reactor is kept at 0.2 MPa. After introducing the $H_2S/Ar$ mixed gas into the reaction apparatus for 30 minutes, an AC high-voltage power supply is switched on, and a plasma discharge field is formed between the inner electrode 3 and the solid grounding electrode by adjusting the voltage and frequency of the high-voltage power supply. Wherein the discharge conditions are as follows: the voltage is 21.3 kV, the frequency is 8.0 kHz, and the current is 1.17 A.

The rest parts of the example are same as those in the example 1.

Results: the conversion of $H_2S$ is measured to be 79.5% after continuously performing the hydrogen sulfide decomposition reaction of the example for 20 minutes; and no abnormality has been discovered after performing the continuous discharge for 100 hours, both the discharge condition and the $H_2S$ conversion are kept stable. In addition, the decomposition energy consumption of the example is 11.3 eV/$H_2S$ molecules.

Example 14

The hydrogen sulfide decomposition reaction is performed by using the low-temperature plasma reaction apparatus illustrated in FIG. 1c, and the low-temperature plasma reaction apparatus of this example differs from the low-temperature plasma reaction apparatus shown in FIG. 1a of the example 1 in the following aspects:

in this example, the second cavity 2 is disposed inside the first cavity 1, and the sidewalls of the first cavity 1 are formed by an outer electrode 4, the material forming the outer electrode 4 is copper foil, and the outer electrode 4 is grounded;

in the example, the third cavity 7 is disposed outside the first cavity 1, the sidewall of the third cavity 7 is formed with stainless steel, the heat-conducting medium in the third cavity 7 is same as that in the second cavity 2, and the temperature of the heat-conducting medium is kept at 230° C.;

the sidewalls of the first cavity 1 are formed by barrier dielectric 6, the solid grounding electrode is disposed on the outer sidewall of the first cavity 1 in a surrounding manner, the material forming the solid grounding electrode is copper foil;

all sidewall of the second cavity 2 is formed by inner electrode 3, the material forming the inner electrode 3 is stainless steel, and the inner electrode 3 is connected with a high-voltage power supply;

the ratio of $L_2$ to the thickness $D_1$ of the barrier dielectric 6 is 0.5:1; and $H_1:L_3=1:200$.

The rest parts of the specific structure and structural parameters of this example are same with those in the example 1.

In the example, a $H_2S/CO_2$ mixed gas is introduced into a first cavity 1 of the low-temperature plasma reaction apparatus from a first inlet 11, wherein the volume fraction of $H_2S$ is 25%, the flow rate of the mixed gas is controlled such that the average residence time of the gas in a discharge region is 11.5 s, and the reaction pressure in the first cavity 1 of the reactor is kept at 0.1 MPa. After introducing the $H_2S/CO_2$ mixed gas into the reaction apparatus for 30 minutes, an AC high-voltage power supply is switched on, and a plasma discharge field is formed between the inner electrode 3 and the solid grounding electrode by adjusting the voltage and frequency of the high-voltage power supply. Wherein the discharge conditions are as follows: the voltage is 13.5 kV, the frequency is 2.4 kHz, and the current is 1.34 A.

The rest parts of the example are same as those in the example 1.

Results: the conversion of $H_2S$ is measured to be 76.7% after continuously performing the hydrogen sulfide decomposition reaction of the example for 20 minutes; and no abnormality has been discovered after performing the continuous discharge for 100 hours, both the discharge condition and the $H_2S$ conversion are kept stable. In addition, the decomposition energy consumption of the example is 12.9 eV/$H_2S$ molecules.

Example 15

The hydrogen sulfide decomposition reaction is performed by using the low-temperature plasma reaction apparatus illustrated in FIG. 2b, and the low-temperature plasma reaction apparatus of this example differs from the low-temperature plasma reaction apparatus shown in FIG. 2a of the example 5 in the following aspects:

In this example, the second cavity 2 is disposed inside the first cavity 1, and the outer electrode 3 is disposed on the inner sidewall of the first cavity 1 in a surrounding manner, the material forming the outer electrode 4 is a stainless steel metal foil, and the outer electrode 4 is grounded;

all sidewall of the second cavity 2 is formed by inner electrode 3, the material forming the inner electrode 3 is stainless steel, and the inner electrode 3 is connected with a high-voltage power supply;

moreover, the temperature of the heat-conducting medium in this example is kept at 182° C.

The barrier dielectric 6 is disposed on the outer sidewall of the second cavity 2 in a surrounding manner;

the ratio of $L_2$ to the thickness $D_1$ of the barrier dielectric 6 is 25:1; and $H_1:L_3=1:120$.

The rest parts of the specific structure and structural parameters of this example are same with those in the example 5.

In the example, a $H_2S/Ar$ mixed gas is introduced into a first cavity 1 of the plasma reaction apparatus from a first inlet 11, wherein the volume fraction of $H_2S$ is 30%, the flow rate of the mixed gas is controlled such that the average residence time of the gas in a discharge region is 10.7 s, and the reaction pressure in the first cavity 1 of the reactor is kept at 0.21 MPa. After introducing the $H_2S$/Ar mixed gas into the reaction apparatus for 30 minutes, an AC high-voltage power supply is switched on, and a plasma discharge field is formed between the inner electrode 3 and the solid grounding electrode by adjusting the voltage and frequency of the high-voltage power supply. Wherein the discharge conditions are as follows: the voltage is 25.1 kV, the frequency is 13.3 kHz, and the current is 0.86 A.

The rest parts of the example are same as those in the example 5.

Results: the conversion of $H_2S$ is measured to be 77.5% after continuously performing the hydrogen sulfide decomposition reaction of the example for 20 minutes; and no abnormality has been discovered after performing the continuous discharge for 100 hours, both the discharge condition and the $H_2S$ conversion are kept stable. In addition, the decomposition energy consumption of the example is 10.3 eV/$H_2S$ molecules.

Example 16

The hydrogen sulfide decomposition reaction is performed by using the low-temperature plasma reaction apparatus illustrated in FIG. 2c, and the low-temperature plasma reaction apparatus of this example differs from the low-temperature plasma reaction apparatus shown in FIG. 2a of the example 5 in the following aspects:

in this example, the second cavity 2 is disposed inside the first cavity 1, the outer electrode 4 is disposed on an inner sidewall of the first cavity 1, the material forming the outer electrode 4 is a copper foil, and the outer electrode 4 is grounded;

all sidewall of the second cavity 2 is formed by an inner electrode 3, the material forming the inner electrode 3 is stainless steel, and the inner electrode 3 is connected with a high-voltage power supply;

a barrier dielectric 6 is disposed on the outer surface of the part of the inner electrode 3 extending into the first cavity 1, the upper edge of the barrier dielectric 6 is higher than the upper edge of the solid grounding electrode, and the material forming the barrier dielectric 6 is ceramic;

in this example, the third cavity 7 is disposed outside the first cavity 1, a sidewall of the third cavity 7 is formed with stainless steel, and the heat-conducting medium in the third cavity 7 is same as that in the second cavity 2.

The ratio of $L_2$ to the thickness $D_1$ of the barrier dielectric 6 is 0.7:1; and $H_1:L_3=1:250$.

The rest parts of the specific structure and structural parameters of this example are same with those in the example 5.

In the example, a $H_2S$/CO mixed gas is introduced into a first cavity of the plasma reaction apparatus from a first inlet, wherein the volume fraction of $H_2S$ is 25%, the flow rate of the mixed gas is controlled such that the average residence time of the gas in a discharge region is 3.0 s, and the reaction pressure in the first cavity 1 of the reactor is kept at 0.16 MPa. After introducing the $H_2S$/CO mixed gas into the reaction apparatus for 30 minutes, an AC high-voltage power supply is switched on, and a plasma discharge field is formed between the inner electrode 3 and the solid grounding electrode by adjusting the voltage and frequency of the high-voltage power supply. Wherein the discharge conditions are as follows: the voltage is 5.1 kV, the frequency is 900 Hz, and the current is 1.15 A.

The rest parts of the example are same as those in the example 5.

Results: the conversion of $H_2S$ is measured to be 76.9% after continuously performing the hydrogen sulfide decomposition reaction of the example for 20 minutes; and no abnormality has been discovered after performing the continuous discharge for 100 hours, both the discharge condition and the $H_2S$ conversion are kept stable. In addition, the decomposition energy consumption of the example is 12.7 eV/$H_2S$ molecules.

Example 17

The hydrogen sulfide decomposition reaction is performed by using the low-temperature plasma reaction apparatus illustrated in FIG. 3b, and the low-temperature plasma reaction apparatus of this example differs from the low-temperature plasma reaction apparatus shown in FIG. 3a of the example 9 in the following aspects:

in this example, the second cavity 2 is disposed inside the first cavity 1, and the outer electrode 3 is disposed on the inner sidewall of the first cavity 1 in a surrounding manner, the material forming the outer electrode 4 is a stainless steel metal foil, and the outer electrode 4 is grounded;

all sidewall of the second cavity 2 is formed by inner electrode 3, the material forming the inner electrode 3 is stainless steel, and the inner electrode 3 is connected with a high-voltage power supply;

the barrier dielectric 6 is disposed between the solid grounding electrode and the high-voltage electrode and does not directly contact with the solid grounding electrode and the high-voltage electrode;

the ratio of $L_2$ to the thickness $D_1$ of the barrier dielectric 6 is 20:1; and $H_1:L_3=1:300$.

The rest parts of the specific structure and structural parameters of this example are same with those in the example 9.

In the example, a $H_2S$/$H_2$ mixed gas is introduced into a first cavity 1 of the low-temperature plasma reaction apparatus from a first inlet 11, wherein the volume fraction of $H_2S$ is 30%, the flow rate of the mixed gas is controlled such that the average residence time of the gas in a discharge region is 11.4 s, and the reaction pressure in the first cavity 1 of the reactor is kept at 0.08 MPa. After introducing the $H_2S$/$H_2$ mixed gas into the reaction apparatus for 30 minutes, an AC high-voltage power supply is switched on, and a plasma discharge field is formed between the inner electrode 3 and the solid grounding electrode by adjusting the voltage and frequency of the high-voltage power supply. Wherein the discharge conditions are as follows: the voltage is 25.4 kV, the frequency is 10.5 kHz, and the current is 0.94 A.

The rest parts of the example are same as those in the example 9.

Results: the conversion of $H_2S$ is measured to be 76.2% after continuously performing the hydrogen sulfide decomposition reaction of the example for 20 minutes; and no abnormality has been discovered after performing the continuous discharge for 100 hours, both the discharge condition and the $H_2S$ conversion are kept stable. In addition, the decomposition energy consumption of the example is 10.5 eV/$H_2S$ molecules.

Example 18

The hydrogen sulfide decomposition reaction is performed by using the low-temperature plasma reaction apparatus illustrated in FIG. 3c, and the low-temperature plasma reaction apparatus of this example differs from the low-temperature plasma reaction apparatus shown in FIG. 3a of the example 9 in the following aspects:

in this example, the second cavity 2 is disposed inside the first cavity 1, the outer electrode 4 is disposed on an inner sidewall of the first cavity 1, the material forming the outer electrode 4 is a copper foil, and the outer electrode 4 is grounded;

all sidewall of the second cavity 2 is formed by inner electrode 3, the material forming the inner electrode 3 is stainless steel, and the inner electrode 3 is connected with a high-voltage power supply;

in this example, the third cavity 7 is disposed outside the first cavity 1, a sidewall of the third cavity 7 is formed with stainless steel, and the heat-conducting medium in the third cavity 7 is same as that in the second cavity 2.

The ratio of $L_2$ to the thickness $D_1$ of the barrier dielectric 6 is 0.5:1; and $H_1:L_3=1:280$.

The rest parts of the specific structure and structural parameters of this example are same with those in the example 9.

In the example, a $H_2S/CO$ mixed gas is introduced into a first cavity of the plasma reaction apparatus from a first inlet 11, wherein the volume fraction of $H_2S$ is 5%, the flow rate of the mixed gas is controlled such that the average residence time of the gas in a discharge region is 3.0 s, and the reaction pressure in the first cavity 1 of the reactor is kept at 0.24 MPa. After introducing the $H_2S/CO$ mixed gas into the reaction apparatus for 30 minutes, an AC high-voltage power supply is switched on, and a plasma discharge field is formed between the inner electrode 3 and the solid grounding electrode by adjusting the voltage and frequency of the high-voltage power supply. Wherein the discharge conditions are as follows: the voltage is 10.7 kV, the frequency is 900 Hz, and the current is 1.95 A.

The rest parts of the example are same as those in example 9.

Results: the conversion of $H_2S$ is measured to be 78.7% after continuously performing the hydrogen sulfide decomposition reaction of the example for 20 minutes; and no abnormality has been discovered after performing the continuous discharge for 100 hours, both the discharge condition and the $H_2S$ conversion are kept stable. In addition, the decomposition energy consumption of the example is 13.5 eV/$H_2S$ molecules.

Example 19

The hydrogen sulfide decomposition reaction is performed by using the low-temperature plasma reaction apparatus illustrated in FIG. 4b, and the low-temperature plasma reaction apparatus of this example differs from the low-temperature plasma reaction apparatus shown in FIG. 4a of the example 11 in the following aspects:

in this example, the second cavity 2 is disposed inside the first cavity 1; all sidewall of the second cavity 2 is formed by inner electrodes 3, the material forming the inner electrodes 3 is stainless steel, and the inner electrodes 3 are connected with a high-voltage power supply;

the barrier dielectric 6 is disposed on the inner sidewall of the first cavity 1 in a surrounding manner, the outer electrode 4 forms the sidewall of the first cavity 1, and the outer electrodes 4 are grounded;

the rest parts of the specific structure and structural parameters of this example are same with those in the example 11.

In the example, a $H_2S/Ar$ mixed gas is introduced into a first cavity 1 of the high-flux low-temperature plasma reaction apparatus from a reactor inlet 11, wherein the volume fraction of $H_2S$ is 45%, the flow rate of the mixed gas is controlled such that the average residence time of the gas in a discharge region is 0.9 s. After introducing the $H_2S/Ar$ mixed gas into the reactor for 30 minutes, an AC high-voltage power supply is switched on, and a plasma discharge field is formed between the inner electrode 3 and the solid grounding electrode by adjusting the voltage and frequency of the high-voltage power supply. Wherein the discharge conditions are as follows: the voltage is 12.7 kV, the frequency is 1.0 kHz, and the current is 4.1 A. The hydrogen sulfide gas is ionized in the discharge region and decomposed into hydrogen and elemental sulphur, and the elemental sulphur generated by discharge flows down slowly along the first cavity wall and discharges from the liquid product outlet 13. The reacted gas flows out from a gas product outlet 12.

The rest parts of the example are same as those in the example 11.

The conversion of $H_2S$ is measured to be 77.6% after continuously performing the hydrogen sulfide decomposition reaction of the example for 20 minutes; and no abnormality has been discovered after performing the continuous discharge for 100 hours, both the discharge condition and the $H_2S$ conversion are kept stable. In addition, the decomposition energy consumption of the example is 19.3 eV/$H_2S$ molecules (the energy required for decomposition of 1 molecule of $H_2S$ is 19.3 eV).

Example 20

The hydrogen sulfide decomposition reaction is performed by using the low-temperature plasma reaction apparatus illustrated in FIG. 4c, and the low-temperature plasma reaction apparatus of this example differs from the low-temperature plasma reaction apparatus shown in FIG. 4a of the example 11 in the following aspects:

in this example, the second cavity 2 is disposed inside the first cavity 1; all sidewall of the second cavity 2 are formed by inner electrodes 3, the material forming the inner electrodes 3 is stainless steel, and the inner electrodes 3 are connected with a high-voltage power supply;

in the example, the third cavity 7 is disposed outside the first cavity 1, a sidewall of the third cavity 7 is formed with stainless steel, and the heat-conducting medium in the third cavity 7 is same as that in the second cavity 2.

the rest parts of the specific structure and structural parameters of this example are same with those in the example 11.

In the example, a $H_2S/Ar$ mixed gas is introduced into a first cavity 1 of the high-flux low-temperature plasma reaction apparatus from a reactor inlet, wherein the volume fraction of $H_2S$ is 65%, the flow rate of the mixed gas is controlled such that the average residence time of the gas in a discharge region is 0.9 s, and the reaction pressure in the first cavity 1 of the reactor is kept at 0.07 MPa. After introducing the $H_2S/Ar$ mixed gas into the reactor for 30 minutes, an AC high-voltage power supply is switched on, and a plasma discharge field is formed between the inner electrode 3 and the solid grounding electrode by adjusting the voltage and frequency of the high-voltage power supply. Wherein the discharge conditions are as follows: the voltage is 10.4 kV, the frequency is 1.2 kHz, and the current is 3.1 A. The hydrogen sulfide gas is ionized in the discharge region and decomposed into hydrogen and elemental sulphur, and the elemental sulphur generated by discharge flows down slowly along the first cavity wall and discharges from the liquid product outlet 13. The reacted gas flows out from a gas product outlet 12.

The rest parts of the example are same as those in the example 11.

The conversion of $H_2S$ is measured to be 78.4% after continuously performing the hydrogen sulfide decomposition reaction of the example for 20 minutes; and no abnormality has been discovered after performing the continuous discharge for 100 hours, both the discharge condition and the $H_2S$ conversion are kept stable. In addition, the decomposition energy consumption of the example is 17.9 eV/$H_2S$ molecules (the energy required for decomposition of 1 molecule of H2S is 17.9 eV).

It is revealed from the above results that the conversion of hydrogen sulfide can be significantly improved compared with the prior art when the low-temperature plasma reaction apparatus provided by the invention is used for decomposition of hydrogen sulfide, and the reaction apparatus provided by the invention can maintain high conversion of hydrogen sulfide and low energy consumption of decomposition for a long period.

The above content describes in detail the preferred embodiments of the invention, but the invention is not limited thereto. A variety of simple modifications can be made in regard to the technical solutions of the invention within the scope of the technical concept of the invention, including a combination of individual technical features in any other suitable manner, such simple modifications and combinations thereof shall also be regarded as the content disclosed by the invention, each of them falls into the protection scope of the invention.

The invention claimed is:

1. A low-temperature plasma reaction apparatus, the reaction apparatus comprising:
    a first cavity provided with a first inlet and a first outlet, respectively;
    a second cavity nested outside or inside the first cavity, and a second inlet and a second outlet are respectively arranged on the second cavity;
    an inner electrode, at least part of the inner electrode extends into the first cavity;
    an outer electrode forming at least part of a sidewall of the first cavity or being disposed on the sidewall of the first cavity in a surrounding manner; and
    a barrier dielectric disposed between the inner electrode and the outer electrode such that a discharge region between the inner electrode and the outer electrode is separated by the barrier dielectric;
    both the inner electrode and the outer electrode are solid electrodes, and the shapes of the inner electrode and the outer electrode are matched with each other to form an isodiametric structure;
    the distance between an outer sidewall of the inner electrode and an inner sidewall of the outer electrode is denoted as $L_1$, the thickness of the barrier dielectric is denoted as $D_1$, $L_2=L_1-D_1$, and the proportional relation between $L_2$ and $D_1$ is (0.1~30):1;
    wherein the first inlet is disposed at an upper portion of the first cavity, and the first outlet is disposed at a lower part and/or a bottom of the first cavity;
    the first outlet includes a gas product outlet and a liquid product outlet, and the gas product outlet is disposed at the lower part of the first cavity, and the liquid product outlet is disposed at the bottom of the first cavity;
    the gas product outlet is disposed below the discharge region, and a proportional relationship between a height $H_1$ of the gas product outlet with respect to the bottom of the first cavity and a length $L_3$ of the discharge region is: $H_1:L_3=1:(30\sim300)$.

2. The low-temperature plasma reaction apparatus according to claim 1, wherein the second cavity is nested outside the first cavity, the reaction apparatus further comprising: a third cavity nested inside the first cavity, and the inner electrode forms at least part of a sidewall of the third cavity or is disposed on the sidewall of the third cavity in a surrounding manner.

3. The low-temperature plasma reaction apparatus according to claim 2, wherein the inner electrode forms at least part of a sidewall of the third cavity or is disposed on the outer sidewall of the third cavity in a surrounding manner.

4. The low-temperature plasma reaction apparatus according to claim 1, wherein the second cavity is nested inside the first cavity, and the inner electrode forms at least part of a sidewall of the second cavity or is disposed on the sidewall of the second cavity in a surrounding manner.

5. The low-temperature plasma reaction apparatus according to claim 4, wherein the inner electrode forms at least part of the sidewall of the second cavity or is disposed on outer sidewall of the second cavity in a surrounding manner.

6. The low-temperature plasma reaction apparatus according to claim 4, wherein the reaction apparatus further comprising: a third cavity nested outside the first cavity.

7. The low-temperature plasma reaction apparatus according to claim 2, wherein the third cavity is provided with a third inlet and a third outlet, respectively.

8. The low-temperature plasma reaction apparatus according to claim 1, wherein the barrier dielectric forms at least part of a sidewall of the first cavity, or the barrier dielectric is disposed on an inner sidewall of the first cavity in a surrounding manner.

9. The low-temperature plasma reaction apparatus according to claim 1, wherein the first cavity is formed by a barrier dielectric.

10. The low-temperature plasma reaction apparatus according to claim 1, wherein the outer electrode is disposed on an outer sidewall of the first cavity in a surrounding manner, and the barrier dielectric forms at least part of the sidewall of the first cavity.

11. The low-temperature plasma reaction apparatus according to claim 1, wherein the barrier dielectric is disposed on at least part of an outer surface of the inner electrode such that at least a part of the outer surface of the inner electrode is wrapped with the barrier dielectric.

12. The low-temperature plasma reaction apparatus according to claim 1, wherein the barrier dielectric is disposed between the inner electrode and the outer electrode in a surrounding manner, both the distance between the barrier dielectric and the inner electrode and the distance between the barrier dielectric and the outer electrode are greater than 0.

13. The low-temperature plasma reaction apparatus according to claim 1, wherein the number of the first cavity is 1; the first cavity is composed of at least two reaction tubes arranged in parallel and having top and bottoms respectively communicating with each other, and each reaction tube is provided with an inner electrode, an outer electrode and a barrier dielectric, respectively; a proportional relationship between $L_2$ and $D_1$ in each of said reaction tubes is: $L_2:D_1=(0.1\sim30):1$; the inner electrodes in each of the reaction tubes are connected in parallel with each other; and the outer electrodes in each of the reaction tubes are connected in parallel with each other.

14. The low-temperature plasma reaction apparatus according to claim 1, wherein the reaction apparatus comprises two or more first cavities, and each of the first cavities is provided with an inner electrode, an outer electrode and a barrier dielectric, respectively; each of the inner electrodes are connected in parallel with each other; and each of the outer electrodes are connected in parallel with one another.

15. The low-temperature plasma reaction apparatus according to claim 1, wherein the material of the barrier dielectric is an electrically insulating material; each of the outer electrode and the inner electrode is independently selected from the group consisting of conductive materials.

16. The low-temperature plasma reaction apparatus according to claim 1, wherein the reaction apparatus further comprises a ground lead, one end of the ground lead is electrically connected to a grounding electrode, which is the outer electrode or the inner electrode, and the other of the outer electrode and the inner electrode is a high-voltage electrode.

17. The low-temperature plasma reaction apparatus according to claim 1, wherein the second inlet and the second outlet are disposed at a lower portion and an upper portion of the second cavity, respectively.

18. The low-temperature plasma reaction apparatus according to claim 7, wherein the third inlet and the third outlet are disposed at a lower portion and an upper portion of the third cavity, respectively.

19. A method for decomposing hydrogen sulfide, which is carried out in the low-temperature plasma reaction apparatus according to claim 1, the method comprising:
 connecting one of the outer electrode and the inner electrode of the low-temperature plasma reaction apparatus with a high-voltage power supply, the other one of the outer electrode and the inner electrode is grounded to carry out the dielectric barrier discharge;
 introducing a feed gas containing hydrogen sulfide into the first cavity from the first inlet of the first cavity of the low-temperature plasma reaction apparatus to carry out decomposition reaction of the hydrogen sulfide;
 discharging a material flow obtained after the decomposition via the first outlet; and
 continuously introducing a heat-conducting medium into the second cavity of the low-temperature plasma reaction apparatus from the second inlet and discharging the heat-conducting medium via the second outlet so as to control the temperature of the first cavity of the low-temperature plasma reaction apparatus.

20. The method according to claim 19, wherein the reaction apparatus comprises: a third cavity nested outside or inside said first cavity, the method further comprising: continuously introducing the heat-conducting medium into the third cavity of the low-temperature plasma reaction apparatus from a third inlet and discharging the heat-conducting medium via the third outlet, which is in synergy with continuously introducing the heat-conducting medium into the second cavity of the low-temperature plasma reaction apparatus from the second inlet and discharging the heat-conducting medium via the second outlet so as to control the temperature of the first cavity of the low-temperature plasma reaction apparatus.

21. The method according to claim 19, wherein the conditions of dielectric barrier discharge comprise: the discharge voltage is 2 kV~80 kV; the discharge frequency is 200~30000 Hz;
 the conditions of decomposition reaction comprise: the reaction temperature is 0~800° C., the reaction pressure is 0-0.6 MPa;
 the residence time of the feed gas containing the hydrogen sulfide in the discharge region of the low-temperature plasma reaction apparatus is $1\times10^{-5}$~120 s.

22. The process according to claim 19, wherein the decomposition reaction of hydrogen sulfide is carried out in the presence of a carrier gas, which is at least one selected from the group consisting of nitrogen, hydrogen, helium, argon, water vapor, carbon monoxide, carbon dioxide, methane, ethane and propane.

* * * * *